(12) United States Patent
Park et al.

(10) Patent No.: US 12,260,058 B2
(45) Date of Patent: Mar. 25, 2025

(54) DIGITIZER AND ELECTRONIC DEVICE INCLUDING SAME

(71) Applicant: Samsung Electronics Co., Ltd., Gyeonggi-do (KR)

(72) Inventors: Changbyung Park, Gyeonggi-do (KR); Myeongsil Park, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/948,422

(22) Filed: Sep. 20, 2022

(65) Prior Publication Data

US 2023/0036968 A1 Feb. 2, 2023

Related U.S. Application Data

(63) Continuation of application No. PCT/KR2022/011013, filed on Jul. 27, 2022.

(30) Foreign Application Priority Data

Jul. 27, 2021 (KR) .................. 10-2021-0098751

(51) Int. Cl.
*G06F 3/046* (2006.01)
*G06F 1/16* (2006.01)

(52) U.S. Cl.
CPC ............ *G06F 3/046* (2013.01); *G06F 1/1616* (2013.01); *G06F 2203/04102* (2013.01); *G06F 2203/04107* (2013.01)

(58) Field of Classification Search
CPC ... G06F 3/046; G06F 1/1616; G06F 2203/041
See application file for complete search history.

(56) References Cited

U.S. PATENT DOCUMENTS

| 9,413,190 | B2 | 8/2016 | Kim et al. | |
| 2009/0166100 | A1* | 7/2009 | Matsubara | .............. G06F 3/046 |
| | | | | 178/18.06 |
| 2010/0188832 | A1 | 7/2010 | Free et al. | |
| 2013/0016073 | A1 | 1/2013 | Lee et al. | |
| 2014/0062948 | A1* | 3/2014 | Lee | ......................... G06F 3/046 |
| | | | | 345/174 |

(Continued)

FOREIGN PATENT DOCUMENTS

KR 10-2014-0028617 A 3/2014
KR 10-2016-0121868 A 10/2016

(Continued)

OTHER PUBLICATIONS

International Search Report dated Oct. 21, 2022.
Extended European Search Report dated Oct. 2, 2024.

*Primary Examiner* — Kenneth B Lee, Jr.
(74) *Attorney, Agent, or Firm* — Cha & Reiter, LLC

(57) ABSTRACT

According to certain embodiments, an electronic device comprises: a display; a coil array layer disposed under the display; a magnetic layer disposed under the coil array layer; a conductive layer disposed under the magnetic layer; a conductive plate disposed under the conductive layer; a bracket disposed under the conductive plate; and a magnetic component disposed on the bracket and under the conductive plate, wherein the conductive layer has a first opening, and the first opening and the magnetic component at least partially overlap each other.

21 Claims, 20 Drawing Sheets

(56) References Cited

U.S. PATENT DOCUMENTS

| | | | |
|---|---|---|---|
| 2014/0335785 A1 | 11/2014 | Kato et al. | |
| 2015/0097806 A1* | 4/2015 | Jeong | G06F 3/0446 |
| | | | 345/174 |
| 2016/0224305 A1* | 8/2016 | Lee | G06F 3/017 |
| 2018/0010900 A1* | 1/2018 | Matsumoto | G01B 7/003 |
| 2018/0032160 A1* | 2/2018 | Park | G06F 3/03545 |
| 2020/0236826 A1* | 7/2020 | Baek | H01F 27/366 |
| 2021/0173437 A1 | 6/2021 | Bae et al. | |
| 2021/0295006 A1* | 9/2021 | Ryu | G06F 3/0445 |

FOREIGN PATENT DOCUMENTS

| | | |
|---|---|---|
| KR | 10-1804579 B1 | 12/2017 |
| KR | 10-2018-0013307 A | 2/2018 |
| KR | 10-2020-0090476 A | 7/2020 |
| KR | 10-2021-0052699 A | 5/2021 |
| KR | 10-2021-0073699 A | 6/2021 |

* cited by examiner

DIGITIZER AND ELECTRONIC DEVICE INCLUDING SAME

CROSS-REFERENCE TO RELATED APPLICATION(S)

This application is a continuation of International Application No. PCT/KR2022/011013, which was filed on Jul. 27, 2022, and claims priority to Korean Patent Application No. 10-2021-0098751, filed on Jul. 27, 2021, in the Korean Intellectual Property Office, the disclosure of which are incorporated by reference herein their entirety.

TECHNICAL FIELD

Certain embodiments of the disclosure relate to a digitizer and an electronic device including the same.

BACKGROUND

Electronic devices are becoming thinner, lighter, smaller, and more multifunctional. For this purpose, displays and various components are disposed in the electronic devices. Since flexible displays can be folded, bent, rolled, or unfolded, the flexible displays are expected to greatly contribute to a reduction in the size of electronic devices and result in a change of design of electronic devices.

An electronic device may include a flexible display, and a digitizer may be applied to convert analog coordinates of contact by an input device (e.g., a stylus pen) into digital data.

A foldable electronic device may include a magnetic component (e.g., a magnet) for fixing a folded state. That is, when the foldable electronic device is in the folded state, there may be two housings connected by a hinge. The foldable electronic device may fold like a book, where the edges of each housing are brought together. The magnetic component can hold the hold the edges together and, at the least, prevent gravity from allowing one housing to freely move about the hinge.

When the magnetic component is located under a digitizer, a magnetic field generated from the magnetic component may affect the digitizer. In addition, the foldable electronic device may include other magnetic components, such as a speaker, a camera, and a vibration motor, to name a few. The magnetic field generated from these magnetic components (e.g., the speaker, the camera, and the vibration motor) may also affect the digitizer. In an electronic device according to certain embodiments of the disclosure, in order to reduce the magnetic field affecting a digitizer, a magnetic shield layer (or a magnetic shield agent) may be disposed under a digitizer. The magnetic shield layer may be capable of reducing the influence of the magnetic force of magnetic components.

In order to reduce the effect of the magnetic field on the digitizer, in the electronic device according to certain embodiments of the disclosure, at least a portion of a conductive layer of the digitizer may be removed to form an opening or slits. In the electronic device according to certain embodiments of the disclosure, in order to reduce a magnetic field affecting the digitizer, a slit may be formed, but not in a bracket on which a magnetic component is disposed.

The technical problems to be addressed by this disclosure are not limited to those described above, and other technical problems, which are not described above, may be clearly understood by a person ordinarily skilled in the related art to which this disclosure belongs.

SUMMARY

According to certain embodiments, an electronic device comprises: a display; a coil array layer disposed under the display; a magnetic layer disposed under the coil array layer; a conductive layer disposed under the magnetic layer; a conductive plate disposed under the conductive layer; a bracket disposed under the conductive plate; and a magnetic component disposed on the bracket and under the conductive plate, wherein the conductive layer has a first opening, and the first opening and the magnetic component at least partially overlap each other.

According to certain embodiments, an electronic device comprises: a display; a coil array layer disposed under the display; a magnetic layer disposed under the coil array layer; a conductive layer disposed under the magnetic layer, a conductive plate disposed under the conductive layer; a bracket disposed under the conductive plate; a magnetic component disposed on the bracket and under the conductive plate; and a magnetic shield part disposed between the digitizer and the bracket and overlapping at least a portion of a top surface of the magnetic component, wherein the conductive layer has a first opening, and the first opening and the magnetic component are disposed to at least partially overlap each other. According to certain embodiments, an electronic device comprises: a display; a coil array layer under the display; a magnetic layer disposed under the coil array layer; a conductive layer disposed under the magnetic layer; a conductive plate disposed under the digitizer; a bracket disposed under the conductive plate; a magnetic component disposed on the bracket; and a magnetic shield part disposed to cover at least one surface of the magnetic component, wherein the conductive layer has a first opening, and the first opening and the magnetic component are disposed to at least partially overlap each other.

An electronic device according to certain embodiments of the disclosure is capable of reducing the influence of a magnetic field of a magnetic component and the generation of an eddy current so that distortion of coordinates due to a nonuniform pen pressure of an electronic pen (e.g., a stylus pen) or signal distortion can be prevented or reduced.

In addition, various effects directly or indirectly identified through the disclosure may be provided.

DETAILED DESCRIPTION

Figure 1:
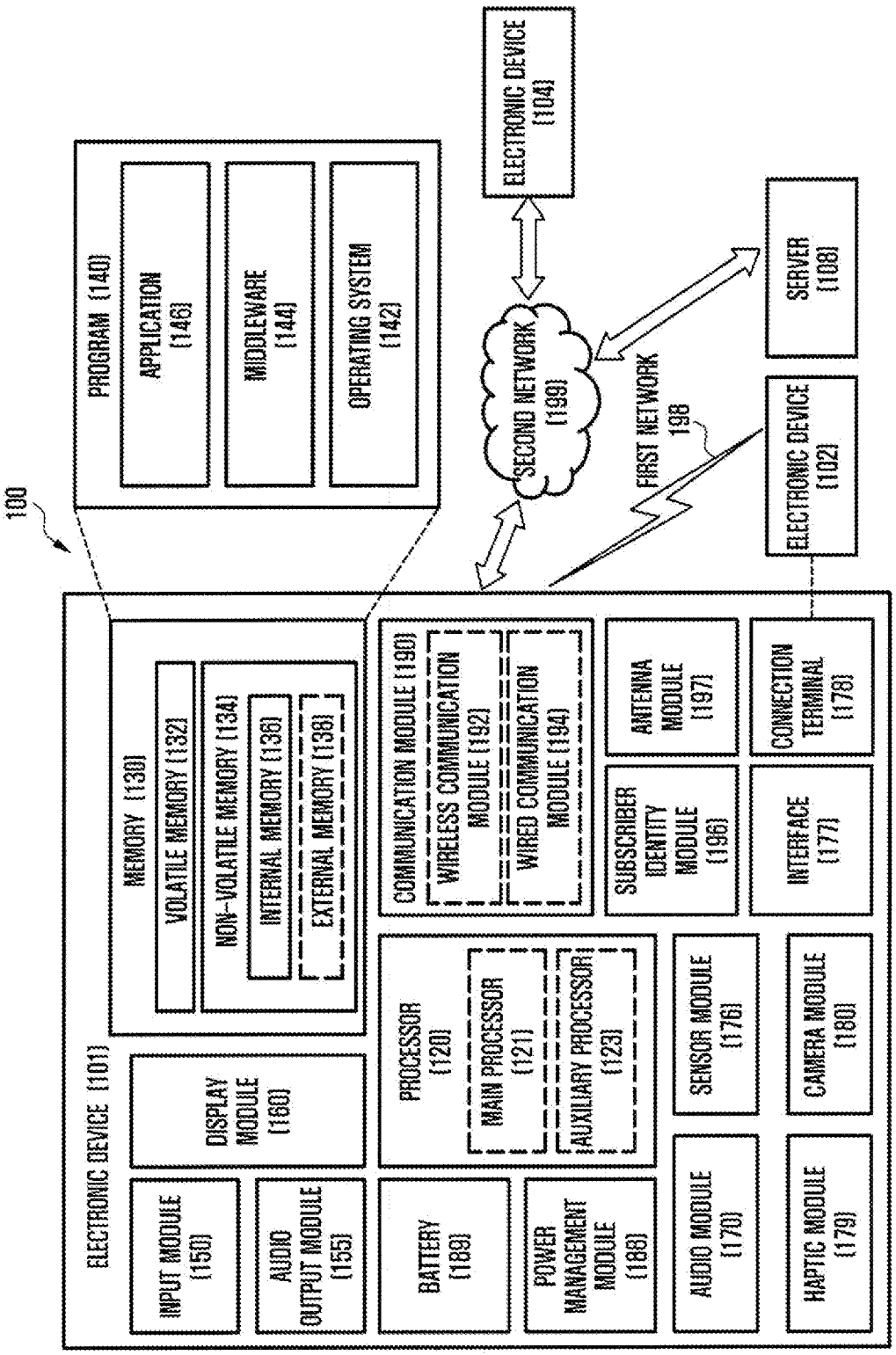
FIG. 1 is a block diagram illustrating an electronic device according to certain embodiments of the disclosure within a network environment.
Figure 2:
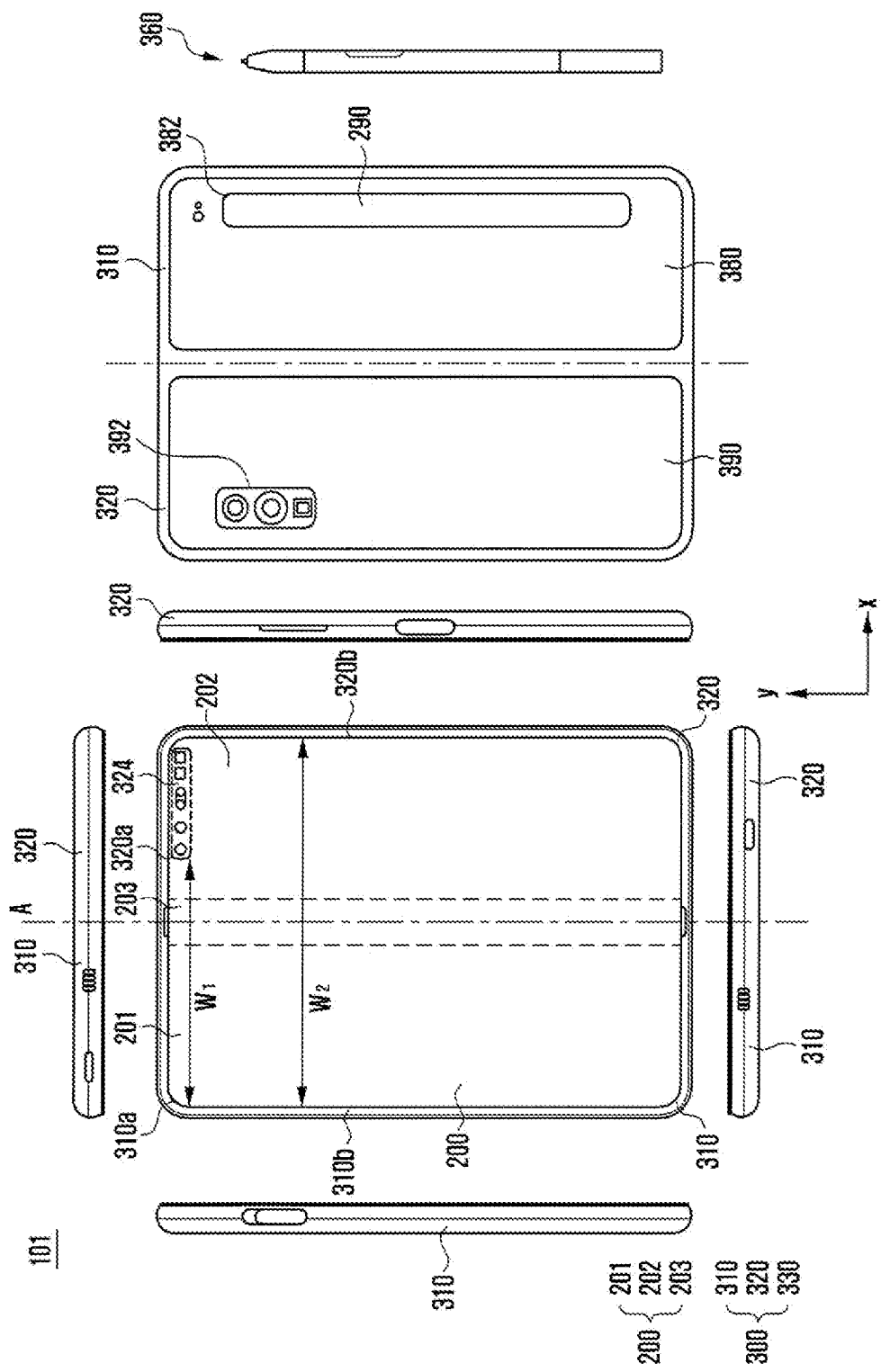
FIG. 2 is a view illustrating an unfolded (e.g., opened) state of an electronic device according to certain embodiments of the disclosure.
Figure 3:
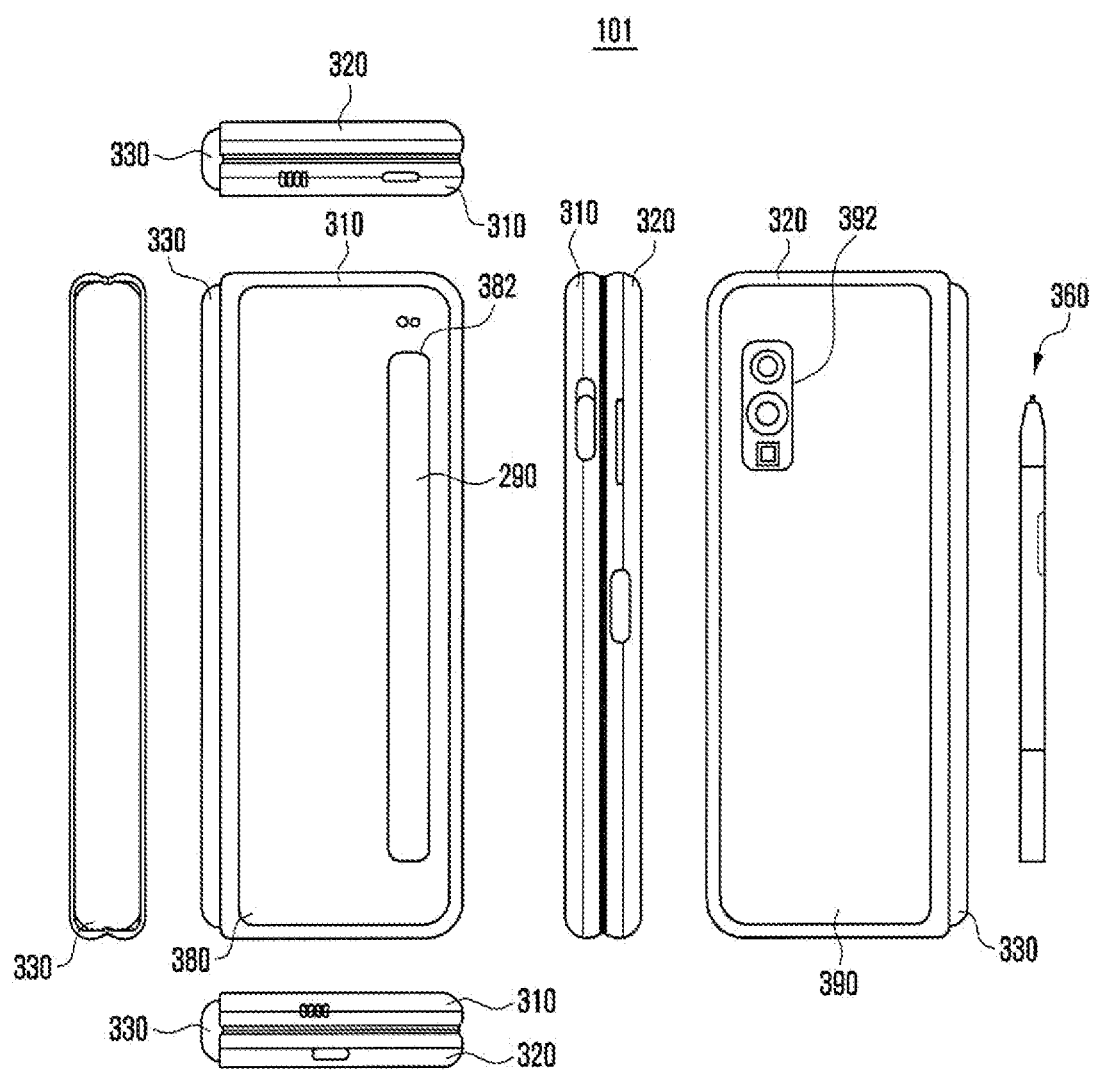
FIG. 3 is a view illustrating a folded (e.g., closed) state of the electronic device according to certain embodiments of the disclosure.

This disclosure will begin with a description of an electronic device in FIG. 1. FIGS. 2 and 3 will then describe the housing of a foldable electronic device.

FIG. 1 is a block diagram illustrating an electronic device 101 in a network environment 100 according to certain embodiments.

Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module(SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thererto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199).

According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to certain embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to certain embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that certain embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with certain embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Certain embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked.

The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to certain embodiments of the disclosure may be included and provided in a computer program product. The computer program product may be traded as a product between a seller and a buyer.

The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to certain embodiments, each component (e.g., a module or a program) of the above-described components may include a single entity or multiple entities, and some of the multiple entities may be separately disposed in different components. According to certain embodiments, one or more of the above-described components may be omitted, or one or more other components may be added. Alternatively or additionally, a plurality of components (e.g., modules or programs) may be integrated into a single component. In such a case, according to certain embodiments, the integrated component may still perform one or more functions of each of the plurality of components in the same or similar manner as they are performed by a corresponding one of the plurality of components before the integration. According to certain embodiments, operations performed by the module, the program, or another component may be carried out sequentially, in parallel, repeatedly, or heuristically, or one or more of the operations may be executed in a different order or omitted, or one or more other operations may be added.

It may be desirable for the electronic device 101 to be reduced in size to allow portability. However, a smaller size also results in a smaller display that may reduce the quality of the user experience. An increased display causes at least one dimension to be increased, and thereby makes it difficult for the user to carry in a pocket or hold in one hand.

A flexible display on a foldable electronic device allows the user fold the device to a smaller size when the user is carrying it. The user can unfold the foldable electronic device when the user is actively using the device, because when the user is actively using the device, the user is usually stationary.

According to an embodiment, a display module 160 illustrated in FIG. 1 may include a display configured to be foldable or unfoldable. In an electronic device including a display, a flexible circuit board (e.g., an FRC cable) may be folded and unfolded in a folding area in which the display is folded at the time of folding.

According to an embodiment, the display module 160 illustrated in FIG. 1 may include a display that is slidably arranged to provide a screen (e.g., a display screen).

For example, the display area of the electronic device 101 is an area that is visually exposed to output an image, and the electronic device 101 may be configured such that the display area can be adjusted according to the movement of the sliding plate (not illustrated) or the movement of the display. A rollable-type electronic device configured to selectively expand a display area by at least partially operating at least a part (e.g., the housing) of the electronic device 101 in a sliding manner may be an example that includes such a display module 160. For example, the display module 160 may be referred to as a slide-out display or an expandable display.

Housing of Foldable Electronic Device

FIG. 2 is a view illustrating an unfolded (e.g., opened) state of an electronic device 101 according to certain embodiments of the disclosure. FIG. 3 is a view illustrating a folded (e.g., closed) state of the electronic device 101 according to certain embodiments of the disclosure.

Referring to FIGS. 2 and 3, the electronic device 101 may include a housing 300, a hinge cover 330 that covers a foldable portion of the housing 300, an electronic pen 360 (e.g., a stylus pen or the electronic pen 360 in FIG. 4, and a flexible or foldable display 200 (hereinafter, simply referred to as a "display 200") disposed within the space defined by the housing 300. Herein, the surface on which the display 200 is disposed is defined as a first surface or the front surface of the electronic device 101.

The surface opposite to the front surface is defined as a second surface or the rear surface of the electronic device 101. In addition, a surface surrounding the space between the front surface and the rear surface is defined as a third surface or the side surface of the electronic device 101. For example, the electronic device 101 may be folded or unfolded in a first direction (e.g., an X-axis direction) with respect to the folding area 203.

In an embodiment, the housing 300 may include a first housing structure 310, a second housing structure 320 including a sensor area 324, a first rear cover 380, and a second rear cover 390. The housing 300 of the electronic device 101 is not limited to the shape and assembly illustrated in FIGS. 2 and 3, but may be implemented by combinations and/or assemblies of other shapes or components. For example, in another embodiment, the first housing structure 310 and the first rear cover 380 may be integrated with each other, and the second housing structure 320 and the second rear cover 390 may be integrated with each other.

In the illustrated embodiment, the first housing structure 310 and the second housing structure 320 may be arranged on opposite sides about the folding axis A, and may have generally symmetrical shapes with respect to the folding axis A. As will be described later, the first housing structure 310 and the second housing structure 320 may have different angles or distances therebetween depending on whether the electronic device 101 is in the unfolded state, in the folded state, or in the intermediate state. In the illustrated state, unlike the first housing structure 310, the second housing structure 320 may further include the sensor area 324 in which various sensors are disposed, but the first housing structure and the second housing structure may have mutually symmetrical shapes in other areas.

In an embodiment, the first housing structure 310 and the second housing structure 320 may define together a recess that accommodates the display 200. In the illustrated embodiment, due to the sensor area 324, the recess may have two or more different widths in a direction perpendicular to the folding axis A.

For example, the recess may have a first width W1 between a first portion 310a of the first housing structure 310 and a first portion 320a of the second housing structure 320 that is provided at an edge of the sensor area 324 of the second housing structure 320. The recess may have a second width W2 formed by a second portion 310b of the first housing structure 310 that is parallel to the folding axis A in the first housing structure 310 and a second portion 320b of the second housing structure 320 that does not correspond to the sensor area 324 in the second housing structure 320 and is parallel to the folding axis A. In this case, the second width W2 may be greater than the first width W1. In other words, the first portion 310a of the first housing structure 310 and the first portion 320a of the second housing structure 320, which have mutually asymmetric shapes, may form the first width W1 of the recess. The second portion 310b of the first housing structure 310 and the second portion 320b of the second housing structure 320, which have mutually symmetrical shapes, may form the second width W2 of the recess. In an embodiment, the distance from the folding axis A to the first portion 320a of the second housing structure 320 and the distance from the folding axis A the second portion 320b of the second housing structure 320 may be different from each other. The widths of the recess are not limited to the illustrated example. In certain embodiments, the recess may have multiple widths due to the shape of the sensor area 324 or due to the asymmetric portions of the first housing structure 310 and the second housing structure 320.

In an embodiment, at least a portion of the first housing structure 310 and at least a portion of the second housing structure 320 may be formed of a metal material or a non-metal material having a rigidity of a level selected in order to support the display 200.

According to an embodiment, the sensor area 324 may have a predetermined area adjacent to one corner of the second housing structure 320. However, the arrangement, shape, and size of the sensor area 324 are not limited to those in the illustrated example. For example, in another embodiment, the sensor area 324 may be provided at another corner of the second housing structure 320 or in any area between the upper and lower end corners. In an embodiment, components embedded in the electronic device 101 to perform various functions may be exposed to the front surface of the electronic device 101 through the sensor area 324 or one or more openings provided in the sensor area 324. In certain embodiments, the components may include various types of sensors. The sensors may include at least one of, for example, a front camera, a receiver, or a proximity sensor.

The first rear cover 380 may be arranged at one side of the folding axis A on the rear surface of the electronic device, and may have, for example, a substantially rectangular periphery, which may be enclosed by the first housing structure 310. Similarly, the second rear cover 390 may be arranged on the other side of the folding axis A in the rear surface of the electronic device, and the periphery of the second rear cover 390 may be enclosed by the second housing structure 320.

In the illustrated embodiment, the first rear cover 380 and the second rear cover 390 may have substantially symmetrical shapes about the folding axis A. However, the first rear cover 380 and the second rear cover 390 do not necessarily have mutually symmetrical shapes. In another embodiment, the electronic device 101 may include the first rear cover 380 and the second rear cover 390 having various shapes. In another embodiment, the first rear cover 380 may be integrated with the first housing structure 310, and the second rear cover 390 may be integrated with the second housing structure 320.

In an embodiment, the first rear cover 380, the second rear cover 390, the first housing structure 310, and the second housing structure 320 may define a space in which various components (e.g., a printed circuit board or a battery) of the electronic device 101 may be arranged.

In an embodiment, an electronic pen 360 (e.g., a stylus pen) may be inserted into and disposed on one side of the space of the electronic device 101. The electronic pen 360 may be inserted (e.g., pushed in) or removed (e.g., pulled out) through a pen hole (not illustrated) formed on a side surface of the electronic device 101. An input by the electronic pen 360 may be detected using a digitizer (e.g., the digitizer 400 of FIG. 4) disposed under the display 200.

The electronic pen 360 can be used to manipulate a user interface displayed on the display 200. The user can take the electronic pen 360 and make contact with the display 200. The electronic device 101 can detect the coordinates that the electronic pen 360 makes contact with on the display 200.

In an embodiment, one or more components may be disposed or visually exposed on the rear surface of the electronic device 101. For example, at least a portion of a sub-display 290 may be visually exposed through a first rear area 382 of the first rear cover 380. In another embodiment, one or more components or sensors may be visually exposed through a second rear area 392 of the second rear cover 390. In certain embodiments, the sensors may include at least one of a proximity sensor, a fingerprint sensor, and/or a rear camera.

The hinge cover 330 may be disposed between the first housing structure 310 and the second housing structure 320 and configured to cover an internal component (e.g., the hinge structure). In an embodiment, the hinge cover 330 may be covered by a portion of the first housing structure 310 and a portion of the second housing structure 320, or may be exposed to the outside depending on whether the electronic device 101 is in the unfolded state (flat state) or in the folded state.

As an example, as illustrated in FIG. 2, when the electronic device 101 is in the unfolded state, the hinge cover 330 may not be exposed by being covered by the first housing structure 310 and the second housing structure 320. As an example, as illustrated in FIG. 3, when the electronic device 101 is in the folded state (e.g., the fully folded state), the hinge cover 330 may be exposed to the outside in the space between the first housing structure 310 and the second housing structure 320. As an example, when the first housing structure 310 and the second housing structure 320 are in the intermediate state of being folded with a certain angle therebetween, the hinge cover 330 may be exposed to the outside in the space between the first housing structure 310 and the second housing structure 320. In this case, however, the exposed area may be smaller than that in the fully folded state. In an embodiment, the hinge cover 330 may include a curved surface.

The display 200 may be disposed in a space defined by the housing 300. For example, the display 200 may be seated in the recess defined by the housing 300, and may constitute most of the front surface of the electronic device 101. Accordingly, the front surface of the electronic device 101 may include the display 200, and a partial area of the first housing structure 310 and a partial area of the second housing structure 320, which are adjacent to the display 200. In addition, the rear surface of the electronic device 101 may include the first rear cover 380, a partial area of the first housing structure 310 adjacent to the first rear cover 380, the second rear cover 390, and a partial area of the second housing structure 320 adjacent to the second rear cover 390.

The display 200 may be a display in which at least a partial area is deformable into a planar surface or a curved surface. In an embodiment, the display 200 may include a folding area 203, a first area 201 disposed on one side of the folding area 203 (e.g., the left side (e.g., the -X-axis direction) of the folding area 203 illustrated in FIG. 2) and a second area 202 disposed on the other side of the folding area 203 (e.g., the right side (e.g., the X-axis direction) of the folding area 103 illustrated in FIG. 2). The display 200 may include a polarizing film (or a polarizing layer), window glass (e.g., an ultra-thin glass (UTG) or polymer window), and an optical compensation film (e.g., an optical compensation film (OCF).

As an embodiment, the display 200 may be coupled or disposed adjacent to a touch sensing circuit, a pressure sensor capable of measuring the intensity (pressure) of a touch, and/or a digitizer (e.g., the digitizer 400 in FIG. 4) capable of detecting an input of the electronic pen 360.

As an embodiment, the area division of the display 200 is exemplary, and the display 200 may be divided into multiple areas (e.g., four or more areas or two areas) depending on the structure or functions thereof. As an example, in the embodiment illustrated in FIG. 2, the area of the display 200 may be divided by the folding area 203 or the folding axis A extending parallel to the y axis. However, in another embodiment, the area of the display 200 may be divided based on another folding area (e.g., a folding area parallel to the x axis) or another folding axis (e.g., a folding axis parallel to the x axis).

The first area 201 and the second area 202 may have generally symmetrical shapes about the folding area 203. However, unlike the first area 201, the second area 202 may include a notch cut due to the presence of the sensor area 324, but may have a shape symmetrical to the first area 201 in areas other than the sensor area. In other words, the first area 201 and the second area 202 may include portions having mutually symmetrical shapes and portions having mutually asymmetrical shapes.

Hereinafter, the operations of the first housing structure 310 and the second housing structure 320 and respective areas of the display 200 according to the states of the electronic device 101 (e.g., the unfolded state (flat state) and the folded state) will be described.

In an embodiment, when the electronic device 101 is in the unfolded state (flat state) (e.g., FIG. 2), the first housing structure 310 and the second housing structure 320 may be disposed to form an angle of about 180 degrees therebetween and to face the same direction. The surface of the first area 201 and the surface of the second area 202 of the display 200 may form about 180 degrees relative to each other and may face the same direction (e.g., the front direction of the electronic device). The folding area 203 may form the same plane as the first area 201 and the second area 202.

In an embodiment, when the electronic device 101 is in the folded state (e.g., FIG. 3), the first housing structure 310 and the second housing structure 320 may be disposed to face each other. The surface of the first area 201 and the surface of the second area 202 of the display 200 may face each other while forming a narrow angle (e.g., an angle between 0 and 10 degrees) relative to each other. At least a portion of the folding area 203 may be configured as a curved surface having a predetermined curvature.

In an embodiment, when the electronic device 101 is in the intermediate state (a half-folded state), the first housing structure 310 and the second housing structure 320 may be arranged to form a certain angle relative to each other.

Figure 4:
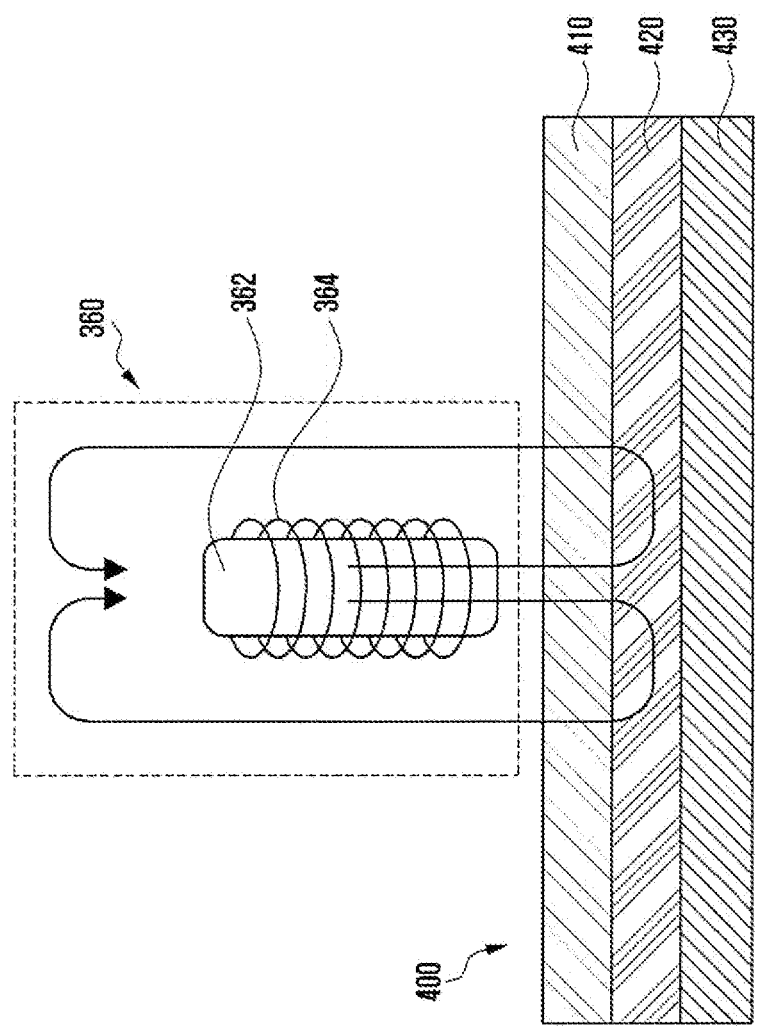
FIG. 4 is a view illustrating an electronic device according to certain embodiments of the disclosure.

FIG. 4 is a view illustrating an electronic device according to certain embodiments of the disclosure. In FIG. 4, an electronic pen 360 comes in proximity with a digitizer 400 that is disposed under a display 200. The digitizer 400 may detect a position by scanning the strength of a magnetic field applied from the electronic pen 360. Referring to FIG. 4, an electronic device (e.g., the electronic device 101 of FIGS. 2 and 3) according to certain embodiments of the disclosure may include a display (e.g., the display 200 in FIGS. 2 and 3), a digitizer 400, and an electronic pen 360 (e.g., a stylus pen).

As an embodiment, the digitizer 400 may be disposed under the display (e.g., the display 200 in FIGS. 2 and 3), and an input of the electronic pen 360 (e.g., a stylus pen) may be detected using the digitizer 400.

As an embodiment, the electronic pen 360 (e.g., a stylus pen) may include a resonance circuit for generating resonance. The resonant circuit may include a magnetic core 362 (e.g., a ferrite core) and a coil 364 (e.g., a coil or inductor for electromagnetic resonance (induction) operation) disposed to surround the magnetic core 362. In addition, the resonance circuit may include a capacitor. The electronic pen 360 (e.g., a stylus pen) may generate a current through interaction with the digitizer 400 (e.g., electromagnetic induction), and may form a magnetic field using the generated current. The resonance circuit may be used to change the strength or frequency of the electromagnetic field according to a user's manipulation state. For example, the resonant circuit may provide various frequencies for recognizing a hovering input, a drawing input, a button input, or an erasing input. For example, the resonance circuit may provide various resonance frequencies by connecting a plurality of capacitors in various combinations, or may provide various resonance frequencies based on a variable inductor and/or a variable capacitor.

As an embodiment, the digitizer 400 may include a coil array layer 410, a magnetic layer 420 (e.g., a ferromagnetic sheet), and a conductive layer 430. As an example, the coil array layer 410 may include a flexible circuit board (FPCB) on which coils are disposed. The magnetic layer 420 may include magnetic metal powder (MMP).

As an embodiment, the digitizer 400 may detect an input (e.g., a touch input or a hovering input) through the electronic pen 360 (e.g., a stylus pen) using an electromagnetic field. For example, a digitizer controller (not illustrated) may provide a current to the digitizer 400, and the digitizer 400 may generate an electromagnetic field. When the electronic pen 360 (e.g., a stylus pen) approaches the electromagnetic field of the digitizer 400, an electromagnetic induction phenomenon may occur, and the resonance circuit of the electronic pen may generate a current.

When the electronic pen 360 (e.g., a stylus pen) approaches the electromagnetic field of the digitizer 400, an electromagnetic induction phenomenon may occur, and the resonance circuit of the electronic pen 360 (e.g., a stylus pen) may generate a current. The resonance circuit of the electronic pen 360 (e.g., a stylus pen) may form a magnetic field using the generated current. The digitizer controller may detect a position by scanning the strength of a magnetic field applied from the electronic pen 360 (e.g., a stylus pen) to the digitizer 400 over the entire area. The digitizer controller provides the detected position to the host device (e.g., the processor 120 in FIG. 1), and the host device may operate in response thereto, for example, may output image information on a display (e.g., the display 200 in FIGS. 2 and 3).

As an embodiment, when the electronic pen 360 (e.g., a stylus pen) is located over the digitizer 400, a magnetic generated from the magnetic core 362 of the electronic pen 360 (e.g., a stylus pen) is induced to the digitizer 400, and when there is no magnetic body outside the digitizer 400, the magnetic layer 420 of the digitizer 400 (e.g., a stylus pen) and the electronic pen 360 may form a closed loop.

To accurately determine the location of the electronic pen 360, it may be beneficial to avoid magnetic fields from other sources.

Figure 5:
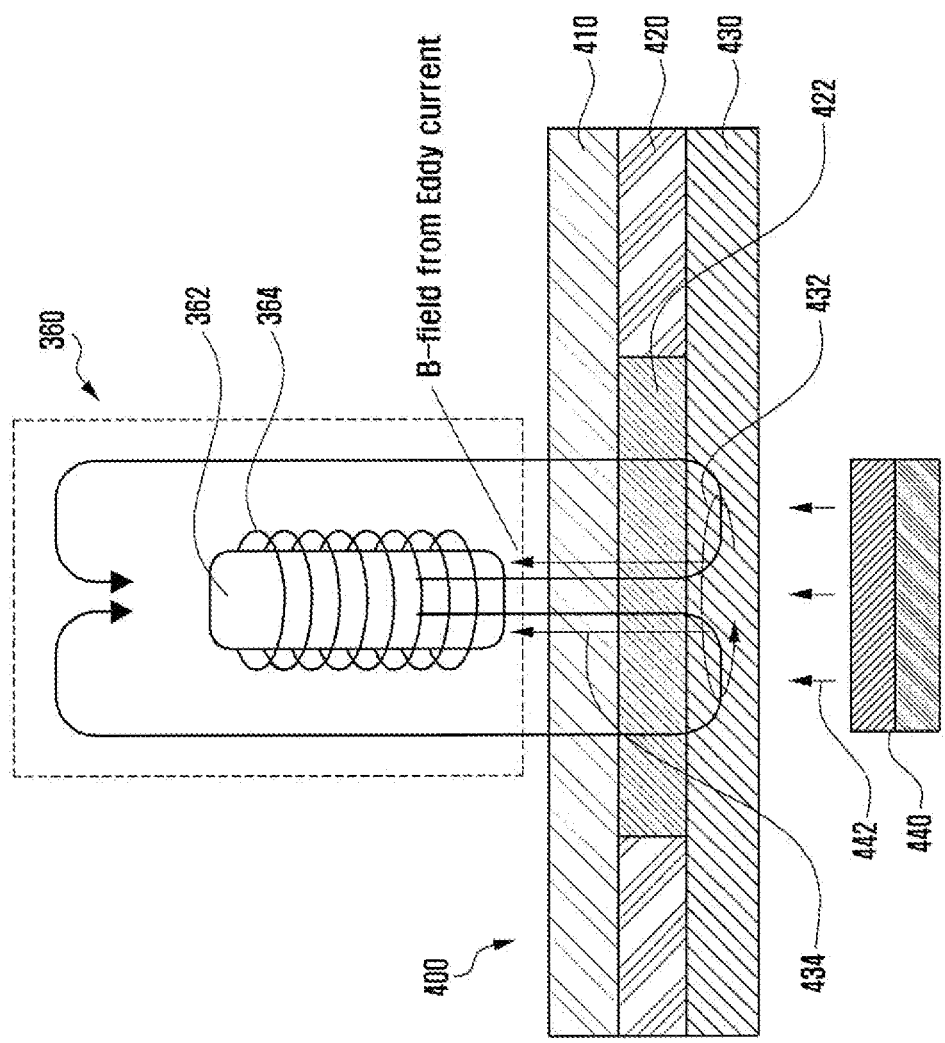
FIG. 5 is a view illustrating an electronic device according to a comparative embodiment.

FIG. 5 is a view illustrating an electronic device with Eddy currents 442 from magnetic components 440 disposed under the digitizer. In FIG. 5 Eddy currents 442 from the magnetic components 440 interfere with the electromagnetic field formed from the electronic pen 360 and the digitizer 400.

Referring to FIG. 5, an electronic device (e.g., the electronic device 101 of FIGS. 2 and 3) may include a magnetic component 440 for fixing the folded state. The digitizer 400 may include a coil array layer 410, a magnetic layer 420 (e.g., a ferromagnetic sheet), and a conductive layer 430. As an example, the coil array layer 410 may include a flexible circuit board (FPCB) on which coils are disposed. The magnetic layer 420 may include magnetic metal powder (MMP). As an example, the magnetic component 440 may include a magnet, a speaker, a camera, or a vibration motor.

When the electronic pen 360 (e.g., a stylus pen) approaches the electromagnetic field of the digitizer 400, an electromagnetic induction phenomenon may occur, and the magnetic field of the electronic pen 360 (e.g., a stylus pen) may be induced into the magnetic layer 420 of the digitizer 400. A magnetic component 440 may be located under the digitizer 400, and a magnetic field 442 generated by the magnetic component 440 may affect the digitizer 400. Magnetic metal powder (MMP) included in the magnetic layer 420 of the digitizer 400 is easily saturated (422) even when exposed to a low-magnitude magnetic field. The permeability thereof may drop sharply and the MMP may not function normally as a magnetic material. The magnetic field generated by the electronic pen 360 (e.g., a stylus pen) goes down to the conductive layer 430 of the digitizer 400, and an eddy current 432 may be generated in a conductive plane around the electronic pen 360. The magnetic field generated by the eddy current 432 may formed in a direction opposite to the magnetic field generated by the electronic pen 360 (e.g., a stylus pen), and the strength of the magnetic field of the electronic pen 360 (e.g., a stylus pen) decreases, distortion of coordinates may be generated due to a nonuniform pen pressure of the electronic pen 360 (e.g., a stylus pen) or signal distortion.

The eddy current 432 is due to the saturation of the magnetic metal powder (MMP). When the generation of the eddy current 432 is reduced, distortion of coordinates due to a nonuniform pen pressure of the electronic pen 360 (e.g., a stylus pen) or signal distortion can be prevented or reduced.

Figure 6:
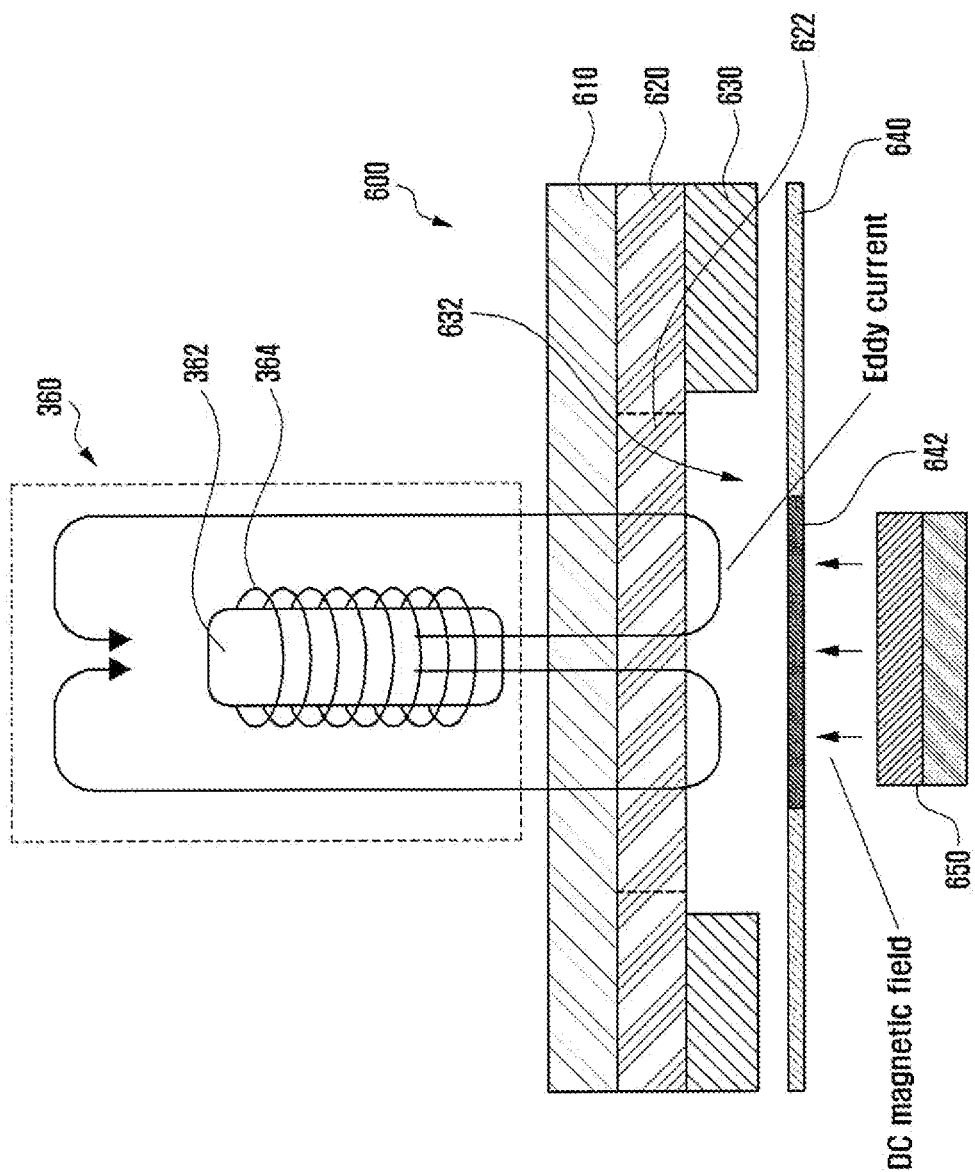
FIG. 6 is a view illustrating an electronic device according to certain embodiments of the disclosure.

FIG. 6 is a view illustrating an electronic device according to certain embodiments of the disclosure. A plate 640 is disposed between the digitizer 600 and the magnetic component 650. The plate 640 can include a magnetic shield part 642 capable of blocking a magnetic field, such as a magnetic field from magnetic component 650. Referring to FIG. 6, an electronic device (e.g., the electronic device 101 of FIGS. 2 and 3) according to certain embodiments of the disclosure may include a digitizer 600, a display (e.g., the display 200 in FIGS. 2 and 3), an electronic pen 360 (e.g., a stylus pen), a plate 640, and a magnetic component 650 for fixing the electronic device in a folded state.

As an embodiment, the digitizer 600 may be disposed under a display (e.g., the display 200 in FIGS. 2 and 3). The plate 640 may be disposed between the digitizer 600 and the magnetic component 650. An input of the electronic pen 360 (e.g., a stylus pen) may be detected using the digitizer 600.

As an embodiment, the digitizer 600 may include a coil array layer 610, a magnetic layer 620 (e.g., a ferromagnetic sheet), and a conductive layer 630. As an example, the coil array layer 610 may include a flexible circuit board (FPCB) on which coils are disposed. The magnetic layer 620 may include magnetic metal powder (MMP).

As an embodiment, the conductive layer 630 may include an opening 632 in which at least a portion is cut. The opening 632 may be formed to at least partially overlap the magnetic component 650.

As an example, the plate 640 may be disposed between the digitizer 600 and the magnetic component 650. The plate 640 may be formed of a conductive metal material (e.g., aluminum). The plate 640 may include a magnetic shield part 642 capable of blocking a magnetic field. The magnetic shield part 642 of the plate 640 may be disposed to overlap the opening 632 and the magnetic component 650.

As an embodiment, when the electronic pen 360 (e.g., a stylus pen) approaches the electromagnetic field of the digitizer 600, an electromagnetic induction phenomenon may occur, and the magnetic field of the electronic pen 360 (e.g., a stylus pen) may be induced into the magnetic layer 620 of the digitizer 600. The magnetic component 650 may be located under the digitizer 600. The magnetic field of the magnetic component 650 may be prevented from affecting the magnetic layer 620 of the digitizer 600 by the magnetic shield part 642 of the plate 640. Even though the magnetic shield part 642 blocks the magnetic field, the magnetic shield part 642 may be partially saturated 622, but since at least a portion of the conductive layer 630 of the digitizer 600 is cut to form an opening 632, it is possible to reduce an eddy current formed in the conductive layer 630 of the digitizer 600 due to the magnetic field generated by the electronic pen 360 (e.g., a stylus pen).

Figure 7:
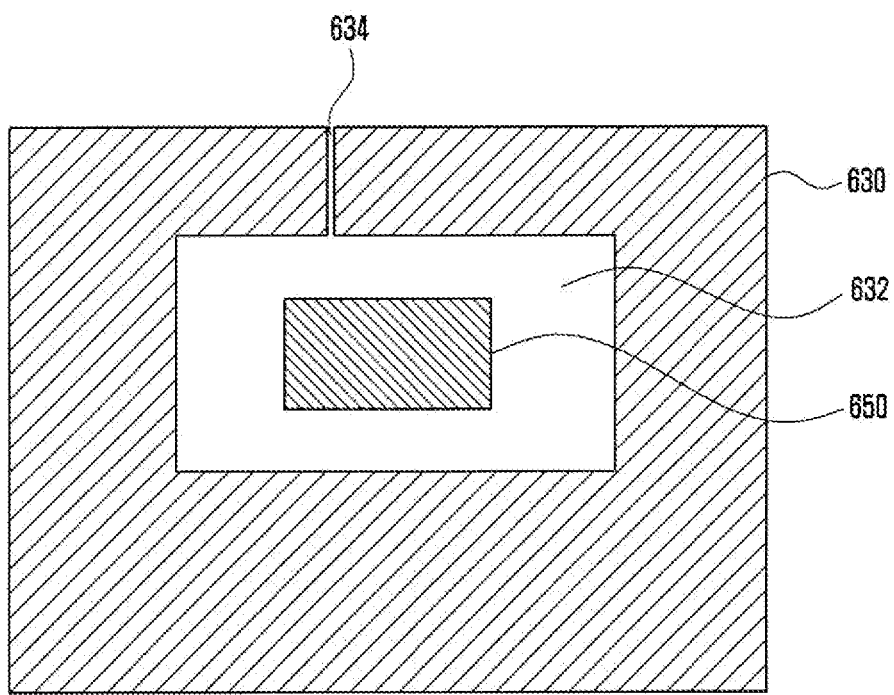
FIG. 7 is a view illustrating reducing the influence of an eddy current by forming a slit in a conductive layer of a digitizer according to certain embodiments of he disclosure.

FIG. 7 is a view illustrating reducing the influence of an eddy current by forming a slit in a conductive layer according to certain embodiments of the disclosure.

Referring to FIGS. 6 and 7, in order to reduce the magnitude of an eddy current, a slit 634 may be formed in at least a portion of the conductive layer 630 so that a closed loop is not formed in the conductive layer 630. In this way, by forming the slit 634 in the conductive layer 630, the magnitude of the eddy current can be reduced. Through this, the influence of the magnetic field of the magnetic component 650 and the generated eddy current can be reduced so that distortion of coordinates due to a nonuniform pen pressure of the electronic pen 360 (e.g., a stylus pen) or signal distortion can be prevented or reduced.

Figure 8:
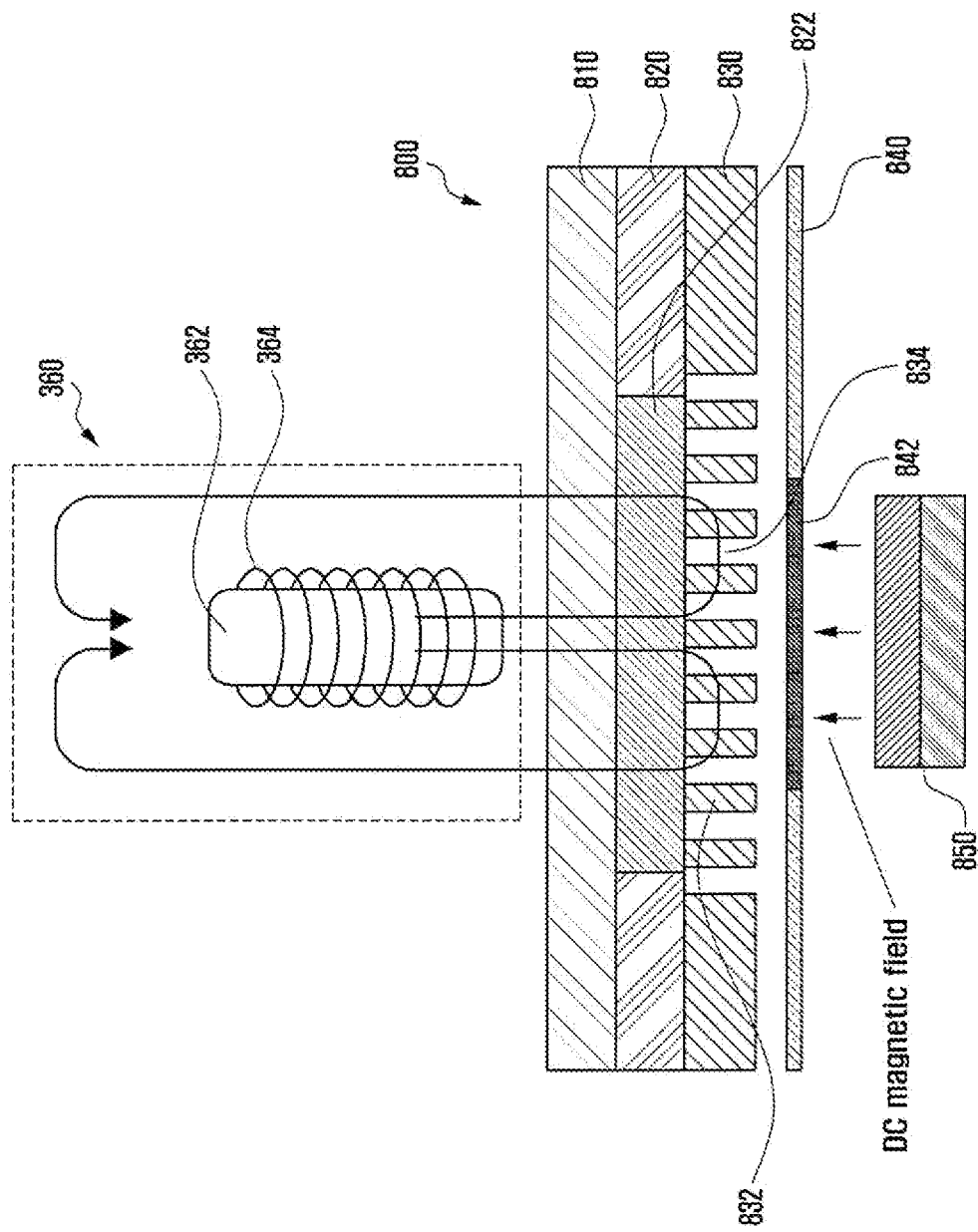
FIG. 8 is a view illustrating an electronic device according to certain embodiments of the disclosure.

FIG. 8 is a view illustrating an electronic device according to certain embodiments of the disclosure. The conductive layer 830 includes slits 834 resulting in portions 832. Additionally, plate 842 is disposed above magnetic component 850.

The plate 842 may block a magnetic field generated by the magnetic component 850. Moreover, inclusion of slits 834 reduces eddy currents formed in the conductive layer 830 due to the magnetic field generated by the electronic pen 360 (e.g., a stylus pen). The foregoing prevent or reduce saturation in the area 822 of the magnetic layer 820 that is directly above the magnetic components 850.

Referring to FIG. 8, an electronic device (e.g., the electronic device 101 of FIGS. 2 and 3) according to certain embodiments of the disclosure may include a digitizer 800, a display (e.g., the display 200 in FIGS. 2 and 3), an electronic pen 360 (e.g., a stylus pen), a plate 840, and a magnetic component 850 for fixing the electronic device in a folded state.

As an embodiment, the digitizer 800 may be disposed under a display (e.g., the display 200 in FIGS. 2 and 3). The plate 840 may be disposed between the digitizer 800 and the magnetic component 850. An input of the electronic pen 360 (e.g., a stylus pen) may be detected using the digitizer 800.

As an embodiment, the digitizer 800 may include a coil array layer 810, a magnetic layer 820 (e.g., a ferromagnetic sheet), and a conductive layer 830. As an example, the coil array layer 810 may include a flexible circuit board (FPCB) on which coils are disposed. The magnetic layer 820 may include magnetic metal powder (MMP). As an embodiment, the conductive layer 830 may include slits 834 in which at least a portion the conductive layer is cut. Since the slits 834 are formed in a portion of the conductive layer 830, portions 832 of the conductive layer 830 may be left, and the portions 832 of the conductive layer 830 may be formed at least partially overlap the magnetic component 850.

As an example, the plate 840 may be disposed between the digitizer 800 and the magnetic component 850. The plate 840 may be formed of a conductive metal material (e.g., aluminum). The plate 840 may include a magnetic shield part 842 capable of blocking a magnetic field. The magnetic shield part 842 of the plate 840 may be disposed to overlap the portions 832 of the conductive layer 830 and the magnetic component 850.

As an embodiment, when the electronic pen 360 (e.g., a stylus pen) approaches the electromagnetic field of the digitizer 800, an electromagnetic induction phenomenon may occur, and the magnetic field of the electronic pen 360 (e.g., a stylus pen) may be induced into the magnetic layer 820 of the digitizer 800. The magnetic component 850 may be located under the digitizer 800. The magnetic field of the magnetic component 850 may be prevented from affecting the magnetic layer 820 of the digitizer 800 by the magnetic shield part 842 of the plate 840.

Accordingly, an area of the magnetic metal powder (MMP) included in the magnetic layer 820 that is directly above the magnetic component 850 that would be susceptible to saturation by the magnetic field of the magnetic component 850 may be prevented from saturation or have reduced saturation. In addition, since at least a portion of the conductive layer 830 of the digitizer 800 is cut to form the slits 834, an eddy current formed in the conductive layer 830 of the digitizer 800 due to a magnetic field generated by the electronic pen 360 (e.g., a stylus pen) can be reduced.

Referring to FIGS. 6 and 8, in order to reduce the magnitude of an eddy current, a slit 634 or slits 834 may be formed in at least a portion of the conductive layer 630 or 830 so that a closed loop is not formed in the conductive layer 630 or 830. In this way, by forming the slit 634 or the slits 834 in the conductive layer 630 or 830, the magnitude of the eddy current can be reduced, and the influence of the eddy current on the digitizer 600 or 800 can be reduced. For example, by adjusting the size of the slit 634 or the slits 834, it is possible to perform adjustment such that the difference between the area in which the conductive layer 630 or 830 is removed and the area in which the conductive layer 630 or 830 is not removed is not large.

Through this, the influence of the magnetic field of the magnetic component 850 and the generated eddy current can be reduced so that distortion of coordinates due to a non-uniform pen pressure of the electronic pen 360 (e.g., a stylus pen) or signal distortion can be prevented or reduced.

Figure 9:
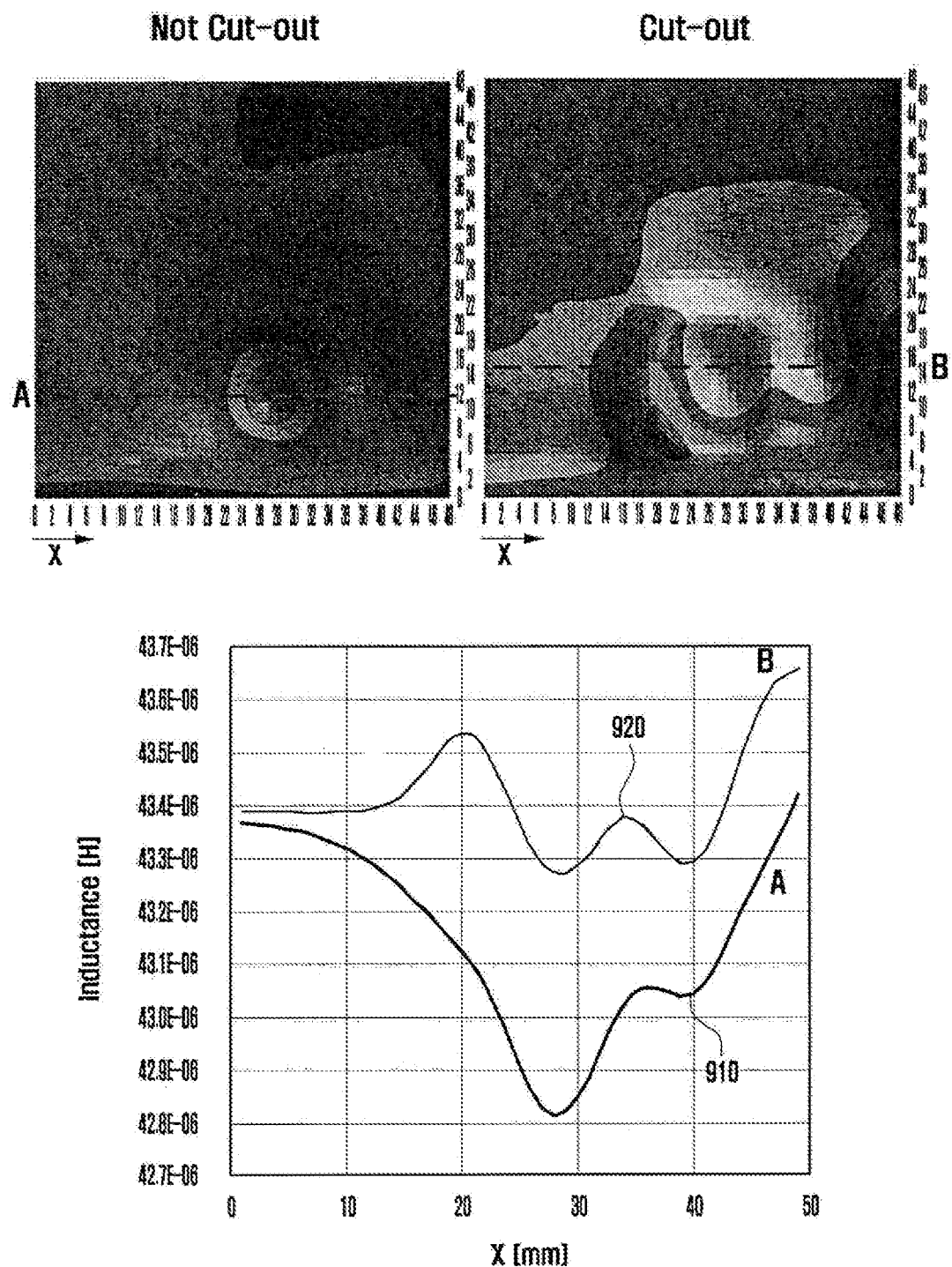
FIG. 9 is a view illustrating inductance when a conductive layer is disposed to overlap the upper portion of a magnetic component and a change in inductance when removing a portion of the conductive layer overlapping the magnetic component.

FIG. 9 is a view illustrating inductance when a conductive layer is disposed to overlap the upper portion of a magnetic component and a change in inductance when removing a portion of the conductive layer overlapping the magnetic component.

Referring to FIGS. 6, 8, and 9, compares a change in inductance 920 when the magnetic components 650 or 850 are located under the digitizer 600 or 800 and when at least a portion of the conductive layer 630 or 830 of the digitizer 600 or 800 is cut to form the opening 632 or the slits 834 and to a change in inductance 910 when the conductive layer is not removed.

On the left, there is a graph of the inductance as a function of the two-dimensional coordinates of the display when no portion of the conductive layer is cut.

On the right, there is a graph of the inductance as a function of the two-dimensional coordinates of the display when slits 834 of the conductive layer are cut. The graph at the bottom shows inductance as a function of x-coordinate, for a constant y (along lines A and B).

The change in inductance 920 when at least a portion of the conductive layer 630 or 830 of the digitizer 600 or 800 is cut to form the opening 632 or the slits 834 is smaller, than when no portion of the conductive layer is cut. Accordingly, distortion of coordinates due to a nonuniform pen pressure of the electronic pen 360 (e.g., a stylus pen) or signal distortion can be prevented or reduced.

Figure 10:
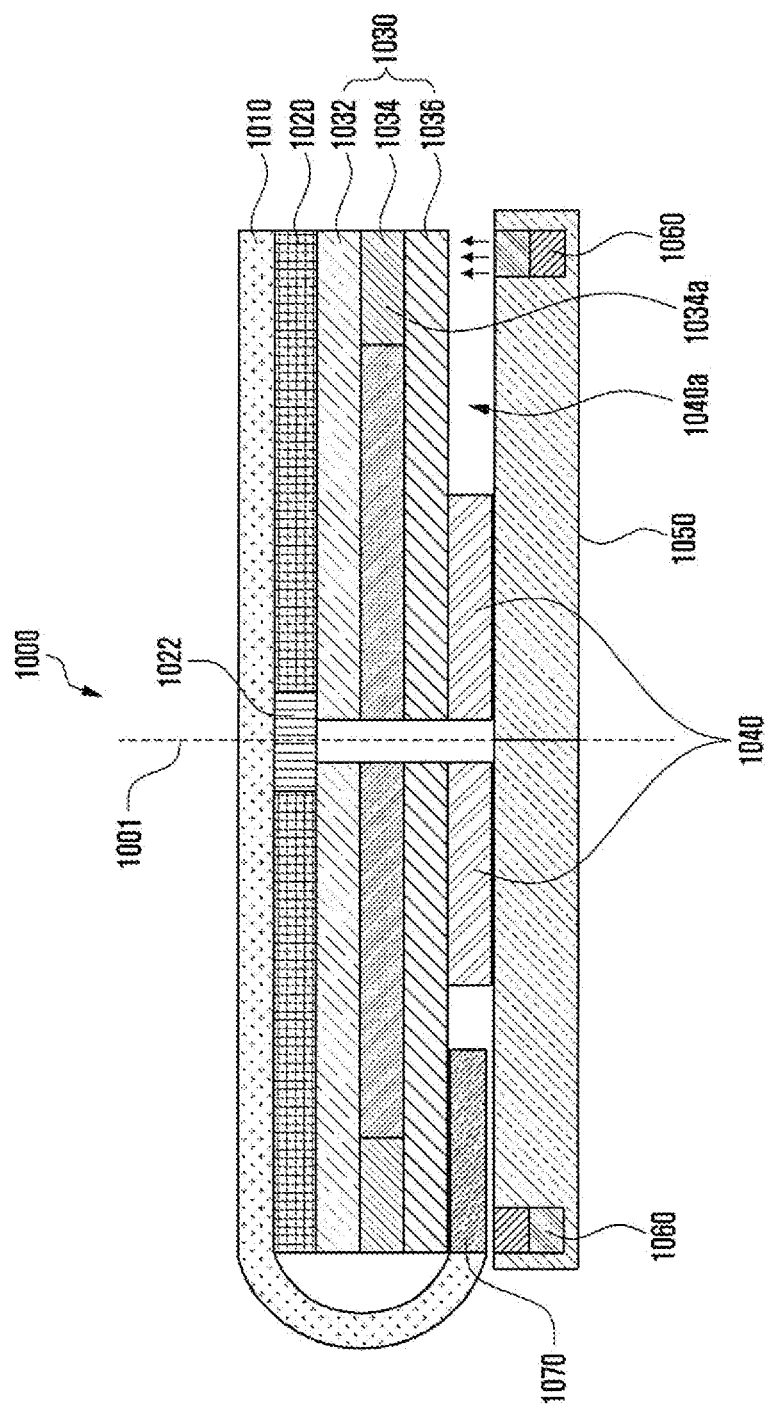
FIG. 10 is a view illustrating an electronic device according to certain embodiments of the disclosure.

FIG. 10 is a view illustrating an electronic device 1000 according to certain embodiments of the disclosure. In FIG. 10, magnetic components 1060 are disposed at the ends of the bracket to fix the electronic device 1000 in a folded state.

Referring to FIG. 10, the electronic device 1000 (e.g., the electronic device 101 in FIGS. 2 and 3) according to certain embodiments of the disclosure may include an electronic pen (e.g., the electronic pen 360 in FIGS. 6 and 8) (e.g., a stylus pen), a display 1010 (e.g., the display 200 in FIGS. 2 and 3), a flexible plate 1020, a digitizer 1030, a plate 1040, a bracket 1050, a magnetic component 1060, and a printed circuit board 1070.

It is noted that FIG. 10 is not drawn to scale. Certain elements are drawing larger for emphasis of certain features.

In order to fix the electronic device 1000 in a folded state, magnetic components 1060 may be disposed on opposite sides of the bracket 1050. When the electronic device 1000 is in a folded state, the bracket 1050 is bent at the folding area 1001, such that magnetic components are close enough to be magnetically attracted. A groove or hole may be formed in at least a portion of each of the opposite sides of the bracket 1050, and the magnetic components 1060 may be disposed in the grooves or holes formed on the opposite sides of the bracket 1050.

As an embodiment, a flexible plate 1020 may be disposed under the display 1010 to support the display 1010. The flexible plate 1020 may include the lattice portion 1022 so that when the electronic device 1000 is folded, the display 1010 can be smoothly supported, folded, and unfolded in the folding area 1001. When the electronic device 1000 is folded by the lattice portion 1022 of the flexible plate 1020, operations according to folding and unfolding may be stably provided.

As an embodiment, the digitizer 1030 may be disposed under the flexible plate 1020. The plate 1040 may be disposed between the digitizer 1030 and the bracket 1050.

As an embodiment, the display 1010 and the digitizer 1030 may be electrically connected to the printed circuit board 1070. The printed circuit board 1070 may include a processor (e.g., the processor 120 in FIG. 1), a memory (e.g., the memory 130 in FIG. 1), a digitizer controller that drives the digitizer 1030, and a display driver IC that drives the display 1010.

As an embodiment, the digitizer 1030 may include a coil array layer 1032, a magnetic layer 1034 (e.g., a ferromagnetic sheet), and a conductive layer 1036. As an example, the coil array layer 1032 may include a flexible circuit board (FPCB) on which coils are disposed. The magnetic layer 1034 may include magnetic metal powder (MMP). The conductive layer 1036 may be disposed to overlap the bracket 1050 and the magnetic component 1060.

As an embodiment, the display 1010 may have a thickness of about 400 μm. The flexible plate 1020 may have a thickness of about 170 μm. The coil array layer 1032 may have a thickness of about 100 μm. The magnetic layer 1034 (e.g., a ferromagnetic sheet) may have a thickness of about 25 μm. The conductive layer 1036 may have a thickness of about 12 μm.

As an example, the plate 1040 may be disposed between the digitizer 1030 and the bracket 1050. For example, the plate 1040 may be formed of a conductive metal material (e.g., aluminum, stainless steel, or a copper alloy). As an example, the plate 1040 may be formed of fiber reinforced plastics (FRP) or carbon fiber reinforced plastics (CFRP). The plate 1040 may include an opening 1040a in which at least a portion of the plate is cut. The opening 1040a may overlap at least a portion of the conductive layer 1036 of the digitizer 1030. In addition, the opening 1040a may overlap at least a portion of the bracket 1050 and at least a portion of the magnetic component 1060. When a portion of the plate 1040 is not cut, the plate 1040 is located between the magnetic component 1060 and the conductive layer 1036 of the digitizer 1030. At least a portion of the plate 1040 is cut to form an opening 1040a, so that the magnetic component 1060 can directly affect the conductive layer 1036 of the digitizer 1030.

As an embodiment, when the electronic pen (e.g., the electronic pen 360 in FIGS. 6 and 8) (e.g., a stylus pen) approaches the electromagnetic field of the digitizer 1030, an electromagnetic induction phenomenon may occur, and the magnetic field of the electronic pen 360 (e.g., a stylus pen) may be induced into the magnetic layer 1034 of the digitizer 1030. The magnetic component 1060 may be located under the digitizer 1030. By removing a portion, such as making slits, of the plate 1040 disposed under the magnetic layer 1034, the generated amount of eddy current is reduced, so that distortion of coordinates due to an uneven pen pressure of the electronic pen 360 (e.g., a stylus pen) or signal distortion can be prevented or reduced.

Figure 11:
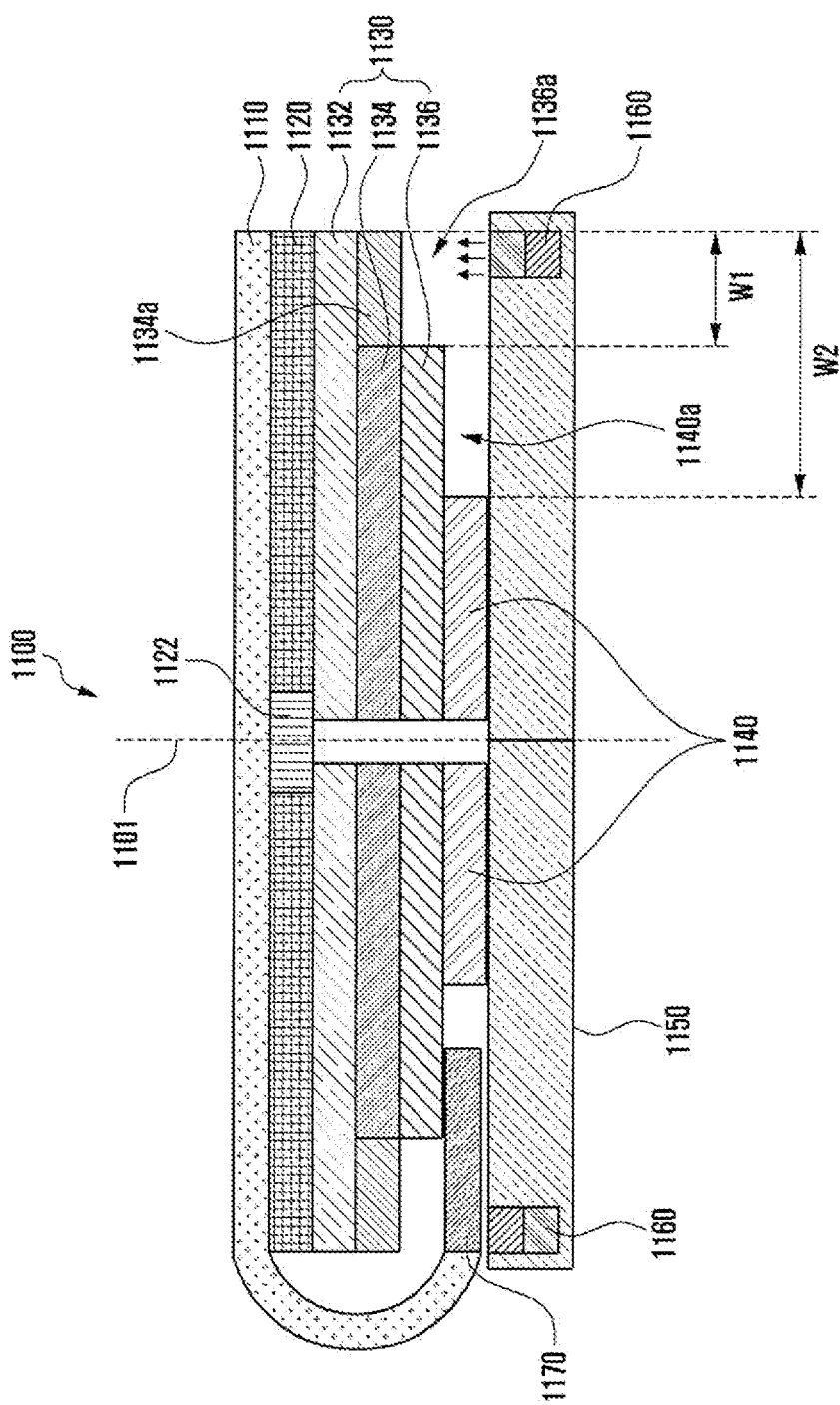
FIG. 11 is a view illustrating an electronic device according to certain embodiments of the disclosure.

FIG. 11 is a view illustrating an electronic device 1100 according to certain embodiments of the disclosure.

Referring to FIG. 11, the electronic device 1100 (e.g., the electronic device 101 in FIGS. 2 and 3) according to certain embodiments of the disclosure may include an electronic pen (e.g., the electronic pen 360 in FIGS. 6 and 8) (e.g., a stylus pen), a display 1110 (e.g., the display 200 in FIGS. 2 and 3), a flexible plate 1120, a digitizer 1130, a plate 1140, a bracket 1150, a magnetic component 1160, and a printed circuit board 1170.

In order to fix the electronic device 1100 in a folded state, magnetic components 1160 may be disposed on opposite sides of the bracket 1150. When the electronic device 1100 is in a folded state, the bracket 1150 is bent at the folding area 1101, such that magnetic components 1160 are close enough to be magnetically attracted. A groove or hole may be formed in at least a portion of each of the opposite sides of the bracket 1150, and the magnetic components 1160 may be disposed in the grooves or holes formed on the opposite sides of the bracket 1050.

As an embodiment, a flexible plate 1120 may be disposed under the display 1110 to support the display 1110. The flexible plate 1120 may include the lattice portion 1122 so that when the electronic device 1100 is folded, the display 1110 can be smoothly supported, folded, and unfolded in the folding area 1101. When the electronic device 1100 is folded by the portion 1122 of the flexible plate 1120, operations according to folding and unfolding may be stably provided.

As an embodiment, the digitizer 1130 may be disposed under the flexible plate 1120. The plate 1140 may be disposed between the digitizer 1130 and the bracket 1150.

As an embodiment, the display 1110 and the digitizer 1130 may be electrically connected to the printed circuit board 1170. The printed circuit board 1170 may include a processor (e.g., the processor 120 in FIG. 1), a memory (e.g., the memory 130 in FIG. 1), a digitizer controller that drives the digitizer 1130, and a display driver IC that drives the display 1110. As an embodiment, the digitizer 1130 may include a coil array layer 1132, a magnetic layer 1134 (e.g., a ferromagnetic sheet), and a conductive layer 1136. As an example, the coil array layer 1132 may include a flexible circuit board (FPCB) on which coils are disposed. The magnetic layer 1134 may include magnetic metal powder (MMP). The conductive layer 1136 of the digitizer 1130 may include an opening 1136a in which at least a portion of the conductive layer is cut. The opening 1136a of the conductive layer 1136 may overlap the bracket 1150 and the magnetic component 1160.

As an example, the plate 1140 may be disposed at a level or height that is above the magnetic components 1160 and below the digitizer 1130. The plate 1140 may be formed of a conductive metal material (e.g., aluminum). The plate 1140 may include an opening 1140a in which at least a portion of the plate is cut.

The opening 1140a of the plate 1140 may overlap at least a portion of the conductive layer 1136 of the digitizer 1130. In addition, the opening 1140a of the plate 1140 may overlap at least a portion of the bracket 1150 and at least a portion of the magnetic component 1160. At least a portion of the plate 1140 is cut to form the opening 1140a, so that the magnetic component 1160 may overlap the digitizer 1130.

As an embodiment, the opening 1136a of the conductive layer 1136 may have a first width w1, and the opening 1140a of the plate 1140 may have a second width w2 wider than the first width w1. The disclosure is not limited thereto, and the first width of the opening 1136a of the conductive layer 1136 and the second width of the opening 1140a of the plate 1140 may have the same size.

As an embodiment, the display 1110 may have a thickness of about 400 μm. The flexible plate 1120 may have a thickness of about 170 μm. The coil array layer 1132 may have a thickness of about 100 μm. The magnetic layer 1134 (e.g., a ferromagnetic sheet) may have a thickness of about 25 μm. The conductive layer 1136 may have a thickness of about 12 μm.

Figure 12:
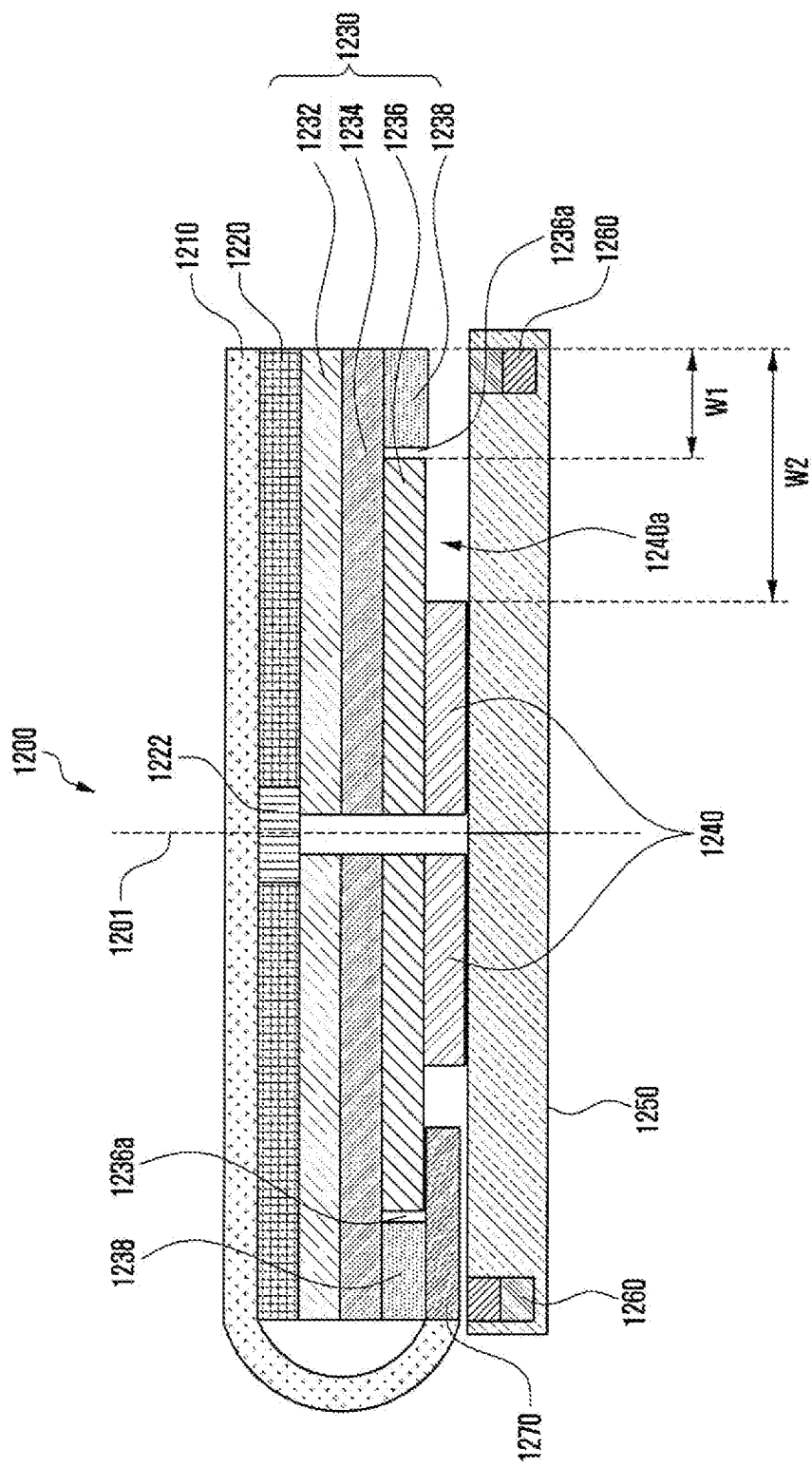
FIG. 12 is a view illustrating an electronic device according to certain embodiments of the disclosure.

As an embodiment, when the electronic pen (e.g., the electronic pen 360 in FIGS. 6 and 8) (e.g., a stylus pen)

approaches the electromagnetic field of the digitizer 1130, an electromagnetic induction phenomenon may occur, and the magnetic field of the electronic pen 360 (e.g., a stylus pen) may be induced into the magnetic layer 1134 of the digitizer 1130. A magnetic component 1160 may be located under the digitizer 1130. Since at least a portion of the conductive layer 1136 of the digitizer 1130 is cut to form the opening 1136a, an eddy current formed in the conductive layer 1036 of the digitizer 1030 due to a magnetic field generated by the electronic pen 360 (e.g., a stylus pen) can be reduced. In addition, the digitizer 1130 and the magnetic component 1160 are disposed to be spaced apart from each other by a predetermined distance, and thus it is possible to prevent or reduce the saturation of magnetic metal powder (MMP) included in the magnetic layer 1134 by the magnetic field of the magnetic component 1160. Through this, distortion of coordinates due to a nonuniform pen pressure of the electronic pen 360 (e.g., a stylus pen) or signal distortion can be prevented or reduced. FIG. 12 is a view illustrating an electronic device 1200 according to certain embodiments of the disclosure.

Referring to FIG. 12, the electronic device 1200 (e.g., the electronic device 101 in FIGS. 2 and 3) according to certain embodiments of the disclosure may include an electronic pen (e.g., the electronic pen 360 in FIGS. 6 and 8) (e.g., a stylus pen), a display 1210 (e.g., the display 200 in FIGS. 2 and 3), a flexible plate 1220, a digitizer 1230, a plate 1240, a bracket 1250, a magnetic component 1260, and a printed circuit board 1270.

In order to fix the electronic device 1200 in a folded state, magnetic components 1260 may be disposed on opposite sides of the bracket 1250. When the electronic device 1200 is in a folded state, the bracket 1250 is bent at the folding area 1201, such that magnetic components 1260 are close enough to be magnetically attracted. A groove or hole may be formed in at least a portion of each of the opposite sides of the bracket 1250, and the magnetic components 1260 may be disposed in the grooves or holes formed on the opposite sides of the bracket 1250.

As an embodiment, a flexible plate 1220 may be disposed under the display 1210 to support the display 1210. The flexible plate 1220 may include the lattice portion 1222 so that when the electronic device 1200 is folded, the display 1210 can be smoothly supported, folded, and unfolded in the folding area 1201. When the electronic device 1200 is folded by the lattice portion 1222 of the flexible plate 1220, operations according to folding and unfolding may be stably provided.

As an embodiment, the digitizer 1230 may be disposed under the flexible plate 1220. The plate 1240 may be disposed between the digitizer 1230 and the bracket 1250.

As an embodiment, the display 1210 and the digitizer 1230 may be electrically connected to the printed circuit board 1270. The printed circuit board 1270 may include a processor (e.g., the processor 120 in FIG. 1), a memory (e.g., the memory 130 in FIG. 1), a digitizer controller that drives the digitizer 1230, and a display driver IC that drives the display 1210.

As an embodiment, the digitizer 1230 may include a coil array layer 1232, a magnetic layer 1234 (e.g., a ferromagnetic sheet), a conductive layer 1236, and a magnetic shield layer 1238. As an example, the coil array layer 1232 may include a flexible circuit board (FPCB) on which coils are disposed. The magnetic layer 1234 may include magnetic metal powder (MMP). The conductive layer 1236 of the digitizer 1230 may include an opening 1236a in which at least a portion of the conductive layer is cut. The magnetic shield layer 1238 may be disposed in the opening 1236a of the conductive layer 1236. The magnetic shield layer 1238 may also be disposed above the printed circuit board 1270. As an example, the magnetic shield layer 1238 may include amorphous silicon, steel plate cold commercial (SPCC), and/or permalloy. The magnetic shield layer 1238 may overlap the bracket 1250 and the magnetic component 1260.

As an embodiment, the display 1210 may have a thickness of about 400 μm. The flexible plate 1220 may have a thickness of about 170 μm. The coil array layer 1232 may have a thickness of about 100 μm. The magnetic layer 1234 (e.g., a ferromagnetic sheet) may have a thickness of about 25 μm. The conductive layer 1236 may have a thickness of about 12 μm. The magnetic shield layer 1238 may have a thickness of about 200 μm.

As an example, the plate 1240 may be disposed at a level or height that is above the magnetic components 1260 and below the digitizer 1230. The plate 1240 may be formed of a conductive metal material (e.g., aluminum). The plate 1240 may include an opening 1240a in which at least a portion of the plate is cut. The opening 1240a of the plate 1240 may overlap at least a portion of the conductive layer 1236 of the digitizer 1230 and the magnetic shield layer 1238. In addition, the opening 1240a of the plate 1240 may overlap at least a portion of the bracket 1250 and at least a portion of the magnetic component 1260. At least a portion of the plate 1240 is cut to form the opening 1240a, so that the magnetic component 1260 may overlap the digitizer 1230.

As an embodiment, the opening 1236a of the conductive layer 1236 may have a first width w1, and the opening 1240a of the plate 1240 may have a second width w2 wider than the first width w1.

As an embodiment, when the electronic pen (e.g., the electronic pen 360 in FIGS. 6 and 8) (e.g., a stylus pen) approaches the electromagnetic field of the digitizer 1230, an electromagnetic induction phenomenon may occur, and the magnetic field of the electronic pen 360 (e.g., a stylus pen) may be induced into the magnetic layer 1234 of the digitizer 1230. The magnetic component 1260 may be located under the digitizer 1230. Since at least a portion of the conductive layer 1236 of the digitizer 1230 may be cut to form an opening, and the magnetic shield layer 1238 is disposed in the opening, it is possible to reduce the eddy current formed in the conductive layer 1236 of the digitizer 1230 due to the magnetic field generated from the electronic pen 360 (e.g., a stylus pen). Through this, distortion of coordinates due to a nonuniform pen pressure of the electronic pen 360 (e.g., a stylus pen) or signal distortion can be prevented or reduced.

Figure 13:
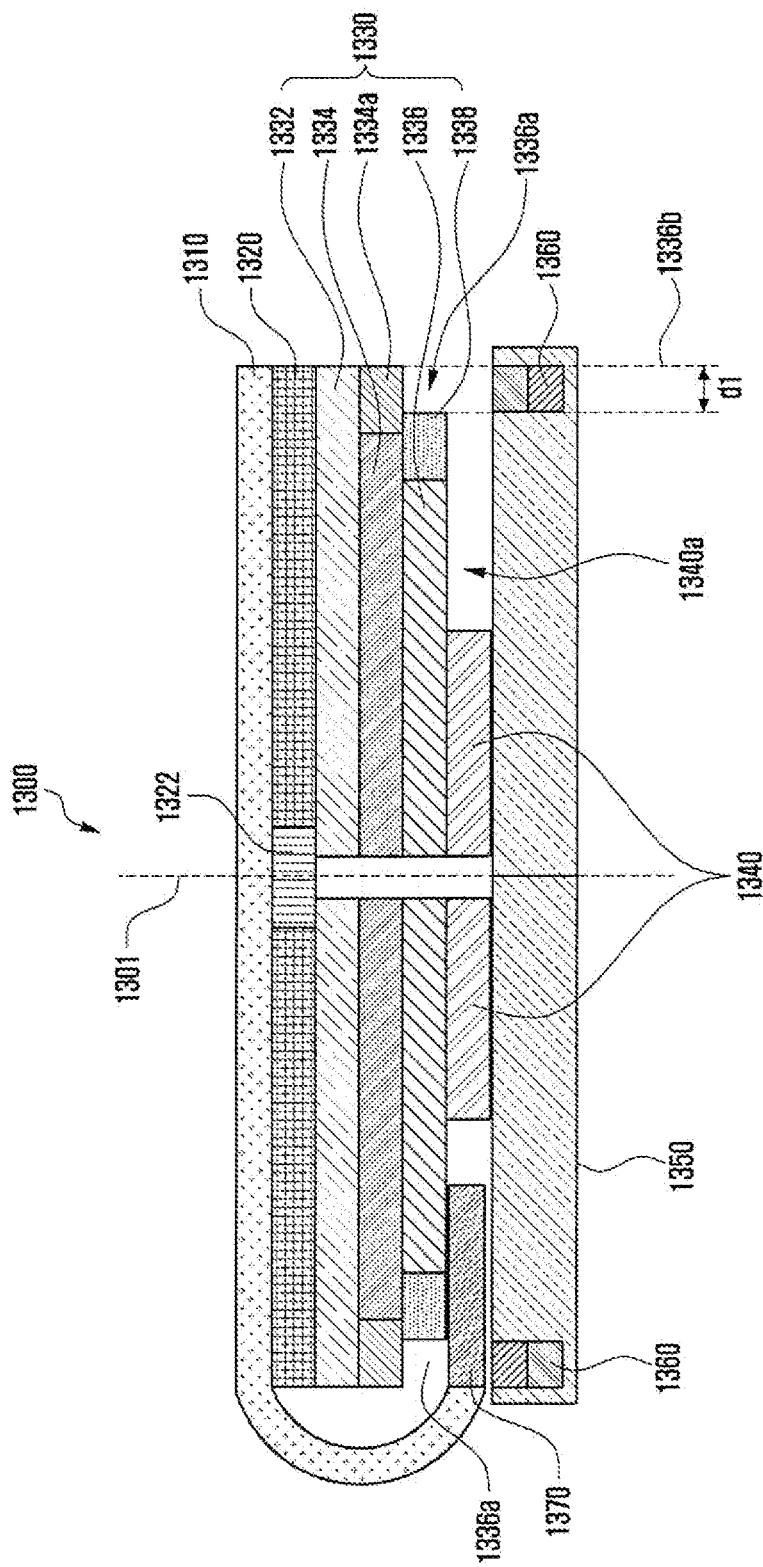
FIG. 13 is a view illustrating an electronic device according to certain embodiments of the disclosure.

FIG. 13 is a view illustrating an electronic device according to certain embodiments of the disclosure.

Referring to FIG. 13, the electronic device 1300 (e.g., the electronic device 101 in FIGS. 2 and 3) according to certain embodiments of the disclosure may include an electronic pen (e.g., the electronic pen 360 in FIGS. 6 and 8) (e.g., a stylus pen), a display 1310 (e.g., the display 200 in FIGS. 2 and 3), a flexible plate 1320, a digitizer 1330, a plate 1340, a bracket 1350, a magnetic component 1360, and a printed circuit board 1370.

In order to fix the electronic device 1300 in a folded state, magnetic components 1360 may be disposed on opposite sides of the bracket 1350. When the electronic device 1300 is in a folded state, the bracket 1350 is bent at the folding area 1301, such that magnetic components 1360 are close enough to be magnetically attracted. A groove or hole may be formed in at least a portion of each of the opposite sides of the bracket 1350, and the magnetic components 1360 may be disposed in the grooves or holes formed on the opposite sides of the bracket 1050.

As an embodiment, a flexible plate 1320 may be disposed under the display 1310 to support the display 1310. The flexible plate 1320 may include the lattice portion 1322 so that when the electronic device 1300 is folded, the display 1310 can be smoothly supported, folded, and unfolded in the folding area 1301. When the electronic device 1300 is folded by the lattice portion 1322 of the flexible plate 1320, operations according to folding and unfolding may be stably provided. As an embodiment, the digitizer 1330 may be disposed under the flexible plate 1320. The plate 1340 may be disposed between the digitizer 1330 and the bracket 1350.

As an embodiment, the display 1310 and the digitizer 1330 may be electrically connected to the printed circuit board 1370. The printed circuit board 1370 may include a processor (e.g., the processor 120 in FIG. 1), a memory (e.g., the memory 130 in FIG. 1), a digitizer controller that drives the digitizer 1330, and a display driver IC that drives the display 1310.

As an embodiment, the digitizer 1330 may include a coil array layer 1332, a magnetic layer 1334 (e.g., a ferromagnetic sheet), a conductive layer 1336, and a magnetic shield layer 1338. As an example, the coil array layer 1332 may include a flexible circuit board (FPCB) on which coils are disposed. The magnetic layer 1334 may include magnetic metal powder (MMP). The conductive layer 1336 of the digitizer 1330 may include an opening 1336*a* in which at least a portion of the conductive layer is cut. The magnetic shield layer 1338 may be disposed in the opening 1336*a* of the conductive layer 1336. The magnetic shield layer 1338 may also be disposed above the printed circuit board 1370. As an example, the magnetic shield layer 1338 may include amorphous silicon, steel plate cold commercial (SPCC), and/or permalloy. The magnetic shield layer 1338 may overlap the bracket 1350 and the magnetic component 1360.

For example, the magnetic shield layer 1338 is spaced apart from the end 1336*b* of the magnetic layer 1334 by a predetermined distance d1 so that the magnetic shield layer 1338 may overlap a portion of the magnetic component 1360.

As an example, the plate 1340 may be disposed at a level or height that is above the magnetic components 1360 and below the digitizer 1330. The plate 1340 may be formed of a conductive metal material (e.g., aluminum). The plate 1340 may include an opening 1340*a* in which at least a portion of the plate is cut.

The opening 1340*a* of the plate 1340 may overlap at least a portion of the conductive layer 1336 of the digitizer 1330 and the magnetic shield layer 1338. In addition, the opening 1340*a* of the plate 1340 may overlap at least a portion of the bracket 1350 and at least a portion of the magnetic component 1360. At least a portion of the plate 1340 is cut to form the opening 1340*a*, so that the magnetic component 1360 may overlap the digitizer 1330.

As an embodiment, when the electronic pen (e.g., the electronic pen 360 in FIGS. 6 and 8) (e.g., a stylus pen) approaches the electromagnetic field of the digitizer 1330, an electromagnetic induction phenomenon may occur, and the magnetic field of the electronic pen 360 (e.g., a stylus pen) may be induced into the magnetic layer 1334 of the digitizer 1330. The magnetic component 1360 may be located under the digitizer 1330. At least a portion of the conductive layer 1336 of the digitizer 1330 may be cut to form an opening 1336*a*, and a magnetic shield layer 1338 may be disposed in the opening 1336*a* so that the saturation 1334*a* of the magnetic layer 1334 can be reduced. Accordingly, an eddy current formed in the conductive layer 1336 of the digitizer 1330 due to a magnetic field generated by the electronic pen 360 (e.g., a stylus pen) can be reduced. Through this, distortion of coordinates due to a nonuniform pen pressure of the electronic pen 360 (e.g., a stylus pen) or signal distortion can be prevented or reduced.

Figure 14:
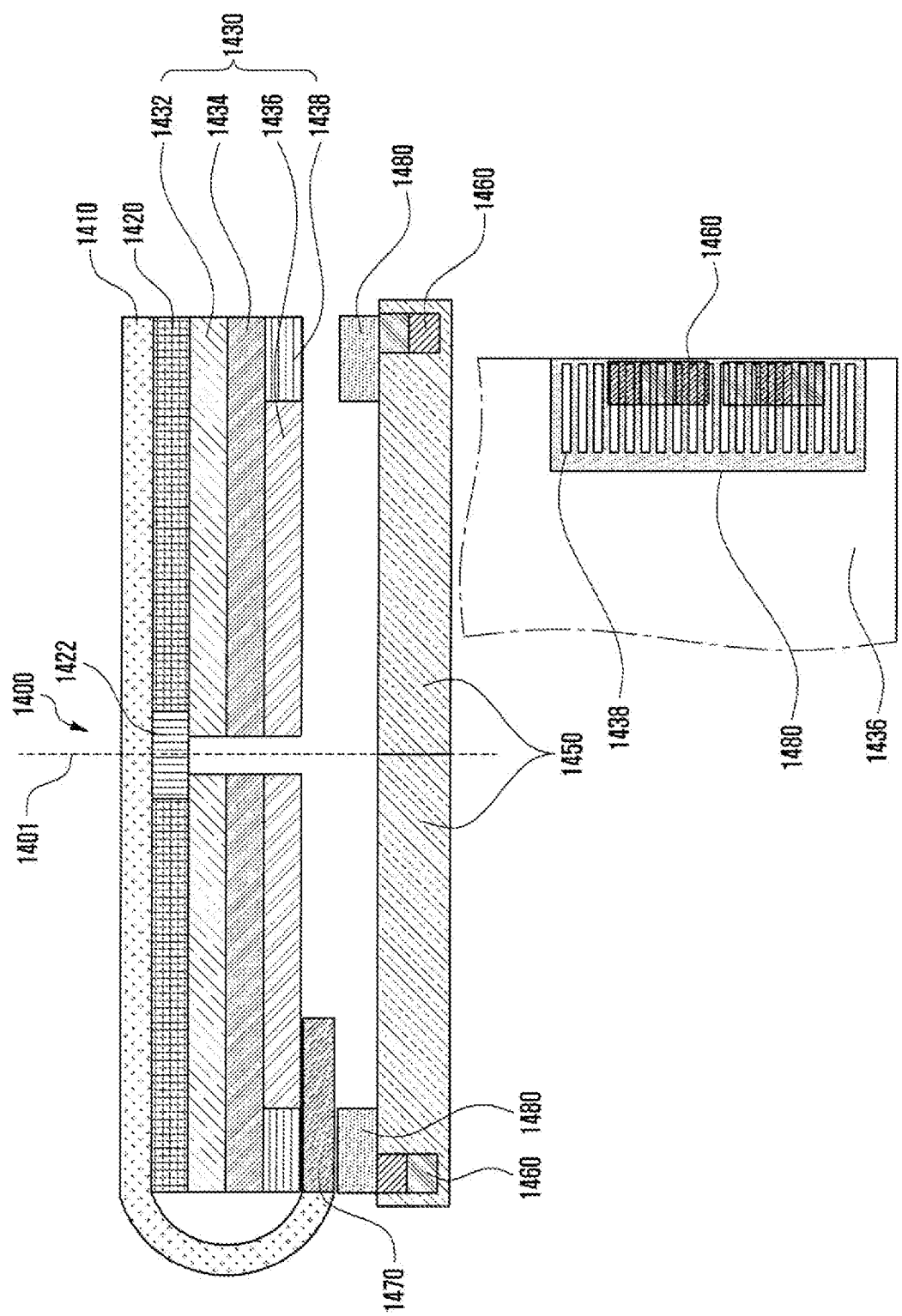
FIG. 14 is a view illustrating an electronic device according to certain embodiments of the disclosure.

FIG. 14 is a view illustrating an electronic device 1400 according to certain embodiments of the disclosure.

Referring to FIG. 14, the electronic device 1400 (e.g., the electronic device 101 in FIGS. 2 and 3) according to certain embodiments of the disclosure may include an electronic pen (e.g., the electronic pen 360 in FIGS. 6 and 8) (e.g., a stylus pen), a display 1410 (e.g., the display 200 in FIGS. 2 and 3), a flexible plate 1420, a digitizer 1430, a bracket 1450, a magnetic component 1460, a printed circuit board 1470, and a magnetic shield part 1480.

In order to fix the electronic device 1400 in a folded state, magnetic components 1460 may be disposed on opposite sides of the bracket 1450. When the electronic device 1400 is in a folded state, the bracket 1450 is bent at the folding area 1401, such that magnetic components 1460 are close enough to be magnetically attracted. A groove or hole may be formed in at least a portion of each of the opposite sides of the bracket 1450, and the magnetic components 1460 may be disposed in the grooves or holes formed on the opposite sides of the bracket 1450.

As an embodiment, a flexible plate 1420 may be disposed under the display 1410 to support the display 1410. The flexible plate 1420 may include the lattice portion 1422 so that when the electronic device 1400 is folded, the display 1410 can be smoothly supported, folded, and unfolded in the folding area 1401. When the electronic device 1400 is folded by the lattice portion 1422 of the flexible plate 1420, operations according to folding and unfolding may be stably provided.

As an embodiment, the digitizer 1430 may be disposed under the flexible plate 1420. The magnetic shield part 1480 may be disposed between the digitizer 1430 and the bracket 1450.

As an embodiment, the display 1410 and the digitizer 1430 may be electrically connected to the printed circuit board 1470. The printed circuit board 1470 may include a processor (e.g., the processor 120 in FIG. 1), a memory (e.g., the memory 130 in FIG. 1), a digitizer controller that drives the digitizer 1430, and a display driver IC that drives the display 1410.

As an embodiment, the digitizer 1430 may include a coil array layer 1432, a magnetic layer 1434 (e.g., a ferromagnetic sheet), and a conductive layer 1436. As an example, the coil array layer 1432 may include a flexible circuit board (FPCB) on which coils are disposed. The magnetic layer 1434 may include magnetic metal powder (MMP). The conductive layer 1436 of the digitizer 1430 may include slits 1438 in which at least a portion of the conductive layer is cut. The slits 1438 may be formed to at least partially overlap the magnetic shield part 1480.

As an embodiment, the magnetic shield part 1480 may be disposed to overlap the entire upper end of the magnetic component 1460. The magnetic shield layer 1480 may also be disposed under the printed circuit board 1470. As an example, the magnetic shield part 1480 may include amorphous silicon, steel plate cold commercial (SPCC), and/or permalloy.

As an embodiment, when the electronic pen (e.g., the electronic pen 360 in FIGS. 6 and 8) (e.g., a stylus pen) approaches the electromagnetic field of the digitizer 1430, an electromagnetic induction phenomenon may occur, and the magnetic field of the electronic pen 360 (e.g., a stylus pen) may be induced into the magnetic layer 1434 of the digitizer 1430. The magnetic component 1460 may be located under the digitizer 1430. At least a portion of the conductive layer 1436 of the digitizer 1430 may be cut to form slits 1438, thereby reducing saturation of the magnetic layer 1434. In addition, since the magnetic shield part 1480 is disposed to overlap the magnetic component 1460, an eddy current formed in the conductive layer 1436 of the digitizer 1430 due to a magnetic field generated by the electronic pen 360 (e.g., a stylus pen) can be reduced. Through this, distortion of coordinates due to a nonuniform pen pressure of the electronic pen 360 (e.g., a stylus pen) or signal distortion can be prevented or reduced.

Figure 15:
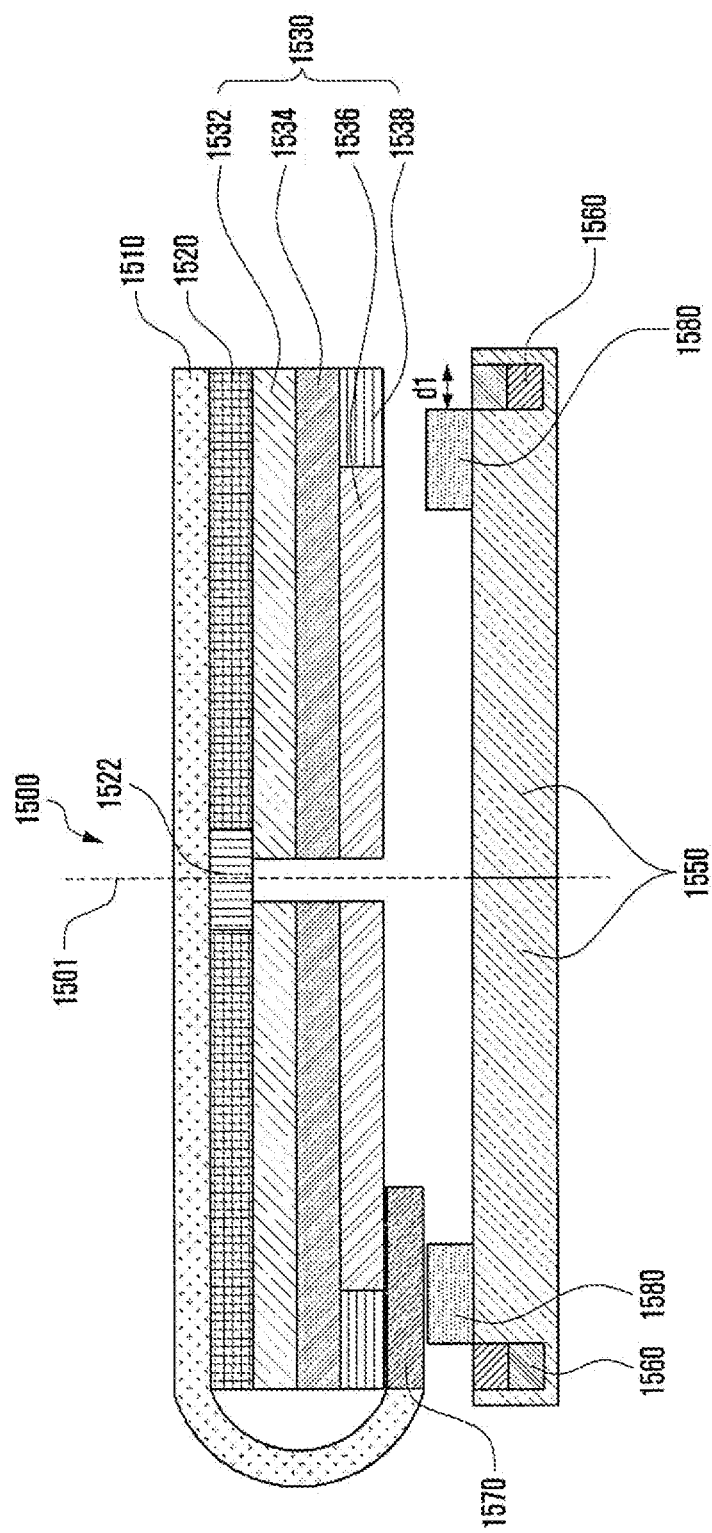
FIG. 15 is a view illustrating an electronic device according to certain embodiments of the disclosure.

FIG. 15 is a view illustrating an electronic device 1500 according to certain embodiments of the disclosure.

Referring to FIG. 15, the electronic device 1500 (e.g., the electronic device 101 in FIGS. 2 and 3) according to certain embodiments of the disclosure may include an electronic pen (e.g., the electronic pen 360 in FIGS. 6 and 8) (e.g., a stylus pen), a display 1510 (e.g., the display 200 in FIGS. 2 and 3), a flexible plate 1520, a digitizer 1530, a bracket 1550, a magnetic component 1560, a printed circuit board 1570, and a magnetic shield part 1580.

In order to fix the electronic device 1500 in a folded state, magnetic components 1560 may be disposed on opposite sides of the bracket 1550. A groove or hole may be formed in at least a portion of each of the opposite sides of the bracket 1550, and the magnetic components 1560 may be disposed in the grooves or holes formed on the opposite sides of the bracket 1550.

As an embodiment, a flexible plate 1520 may be disposed under the display 1510 to support the display 1510. The flexible plate 1520 may include the lattice portion 1522 so that when the electronic device 1500 is folded, the display 1510 can be smoothly supported, folded, and unfolded in the folding area 1501. When the electronic device 1500 is folded by the lattice portion 1522 of the flexible plate 1520, operations according to folding and unfolding may be stably provided.

As an embodiment, the digitizer 1530 may be disposed under the flexible plate 1520. The magnetic shield part 1580 may be disposed between the digitizer 1530 and the bracket 1550.

As an embodiment, the display 1510 and the digitizer 1530 may be electrically connected to the printed circuit board 1570. The printed circuit board 1570 may include a processor (e.g., the processor 120 in FIG. 1), a memory (e.g., the memory 130 in FIG. 1), a digitizer controller that drives the digitizer 1530, and a display driver IC that drives the display 1510.

As an embodiment, the digitizer 1530 may include a coil array layer 1532, a magnetic layer 1534 (e.g., a ferromagnetic sheet), and a conductive layer 1536. As an example, the coil array layer 1532 may include a flexible circuit board (FPCB) on which coils are disposed. The magnetic layer 1534 may include magnetic metal powder (MMP). The conductive layer 1536 of the digitizer 1530 may include slits 1538 in which at least a portion of the conductive layer is cut. The slits 1538 may be formed to at least partially overlap the magnetic shield part 1580 and the magnetic component 1560. As an embodiment, the magnetic shield part 1580 is disposed to be spaced apart from an end of the magnetic layer 1534 by a predetermined distance d1 so that the magnetic shield part 1580 can be disposed to overlap a portion of the upper end of the magnetic component 1560.

The magnetic shield layer 1580 may also be disposed under the printed circuit board 1570. As an example, the magnetic shield part 1580 may include amorphous silicon, steel plate cold commercial (SPCC), and/or permalloy.

As an embodiment, when the electronic pen (e.g., the electronic pen 360 in FIGS. 6 and 8) (e.g., a stylus pen) approaches the electromagnetic field of the digitizer 1530, an electromagnetic induction phenomenon may occur, and the magnetic field of the electronic pen 360 (e.g., a stylus pen) may be induced into the magnetic layer 1534 of the digitizer 1530. The magnetic component 1560 may be located under the digitizer 1530. At least a portion of the conductive layer 1536 of the digitizer 1530 may be cut to form slits 1538, thereby reducing saturation of the magnetic layer 1534. In addition, since the magnetic shield part 1580 is disposed to at least partially overlap the magnetic component 1560, an eddy current formed in the conductive layer 1536 of the digitizer 1530 due to a magnetic field generated by the electronic pen 360 (e.g., a stylus pen) can be reduced. Through this, distortion of coordinates due to a nonuniform pen pressure of the electronic pen 360 (e.g., a stylus pen) or signal distortion can be prevented or reduced.

Figure 16:
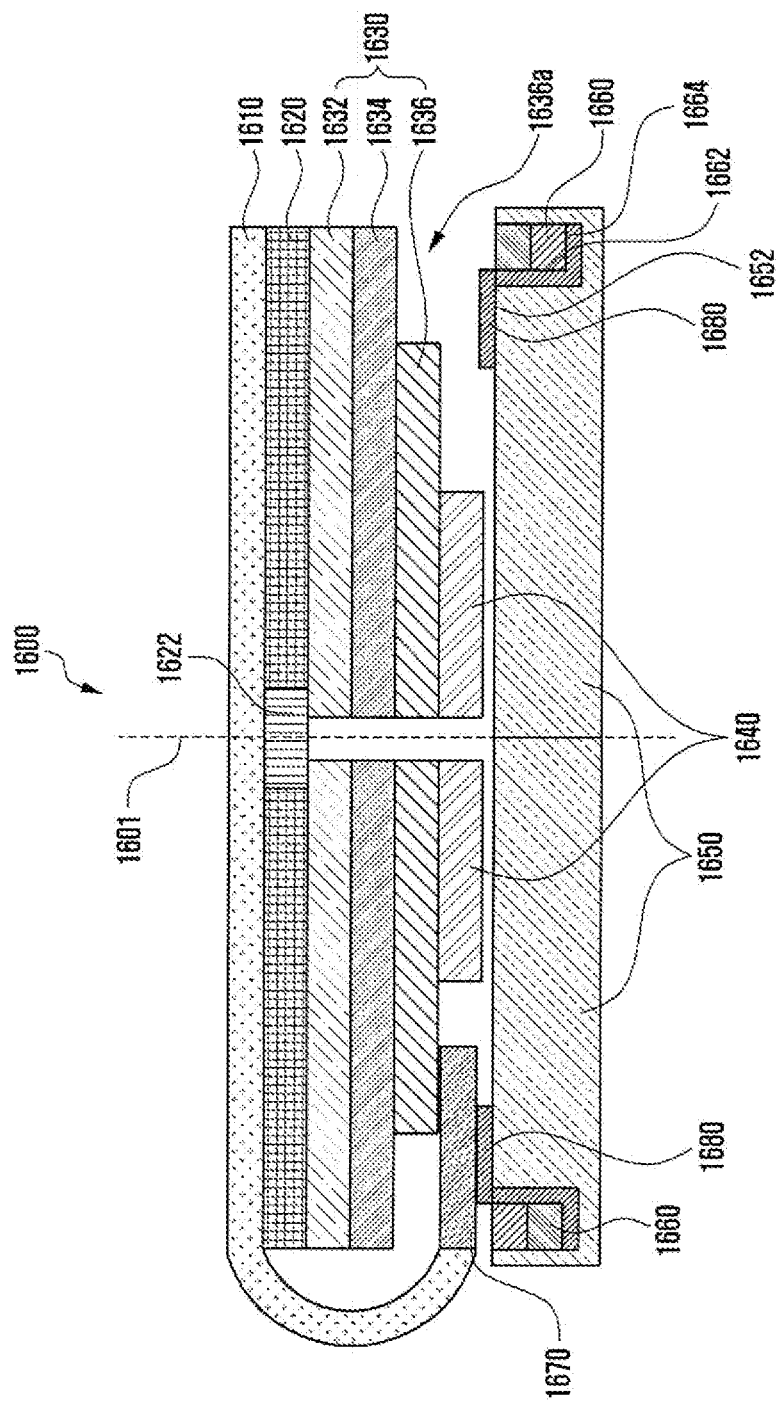
FIG. 16 is a view illustrating an electronic device according to certain embodiments of the disclosure.

FIG. 16 is a view illustrating an electronic device 1600 according to certain embodiments of the disclosure.

Referring to FIG. 16, the electronic device 1600 (e.g., the electronic device 101 in FIGS. 2 and 3) according to certain embodiments of the disclosure may include an electronic pen (e.g., the electronic pen 360 in FIGS. 6 and 8) (e.g., a stylus pen), a display 1610 (e.g., the display 200 in FIGS. 2 and 3), a flexible plate 1620, a digitizer 1630, a bracket 1650, a magnetic component 1660, a printed circuit board 1670, and a magnetic shield part 1680.

In order to fix the electronic device 1600 in a folded state, magnetic components 1660 may be disposed on opposite sides of the bracket 1650. A groove or hole may be formed in at least a portion of each of the opposite sides of the bracket 1650, and the magnetic components 1660 may be disposed in the grooves or holes formed on the opposite sides of the bracket 1650.

As an embodiment, a flexible plate 1620 may be disposed under the display 1610 to support the display 1610. The flexible plate 1620 may include the lattice portion 1622 so that when the electronic device 1600 is folded, the display 1610 can be smoothly supported, folded, and unfolded in the folding area 1601. When the electronic device 1600 is folded by the lattice portion 1622 of the flexible plate 1620, operations according to folding and unfolding may be stably provided.

As an embodiment, the digitizer 1630 may be disposed under the flexible plate 1620. The magnetic shield part 1680 may be disposed between the digitizer 1630 and the bracket 1650. As an embodiment, the display 1610 and the digitizer 1630 may be electrically connected to the printed circuit board 1670. The printed circuit board 1670 may include a processor (e.g., the processor 120 in FIG. 1), a memory (e.g., the memory 130 in FIG. 1), a digitizer controller that drives the digitizer 1630, and a display driver IC that drives the display 1610.

As an embodiment, the digitizer 1630 may include a coil array layer 1632, a magnetic layer 1634 (e.g., a ferromagnetic sheet), and a conductive layer 1636. As an example, the coil array layer 1632 may include a flexible circuit board (FPCB) on which coils are disposed. The magnetic layer 1634 may include magnetic metal powder (MMP). The conductive layer 1636 of the digitizer 1630 may include an opening 1636a in which a portion of the conductive layer is cut. The opening 1636a of the conductive layer 1636 may be formed to at least partially overlap the magnetic shield part 1680 and the magnetic component 1660.

As an embodiment, the magnetic shield part 1680 may be disposed to surround the side surface 1662 and the bottom surface 1664 of the magnetic component 1660. The magnetic shield part 1680 may be disposed to cover at least a portion of the top surface 1652 of the bracket 1650.

As an embodiment, the magnetic shield part 1680 may also be disposed on a portion overlapping the printed circuit board 1670. As an example, the magnetic shield part 1680 may include amorphous silicon, steel plate cold commercial (SPCC), and/or permalloy.

As an embodiment, when the electronic pen (e.g., the electronic pen 360 in FIGS. 6 and 8) (e.g., a stylus pen) approaches the electromagnetic field of the digitizer 1630, an electromagnetic induction phenomenon may occur, and the magnetic field of the electronic pen 360 (e.g., a stylus pen) may be induced into the magnetic layer 1634 of the digitizer 1630. The magnetic component 1660 may be located under the digitizer 1630. At least a portion of the conductive layer 1636 of the digitizer 1630 may be cut to form an opening 1636a. Since the opening 1636a is formed in at least a portion of the conductive layer 1636, saturation of the magnetic layer 1634 can be reduced. In addition, since the magnetic shield part 1680 is around the magnetic component 1660, an eddy current formed in the conductive layer 1636 of the digitizer 1630 due to a magnetic field generated by the electronic pen 360 (e.g., a stylus pen) can be reduced. Through this, distortion of coordinates due to a nonuniform pen pressure of the electronic pen 360 (e.g., a stylus pen) or signal distortion can be prevented or reduced.

Figure 17:
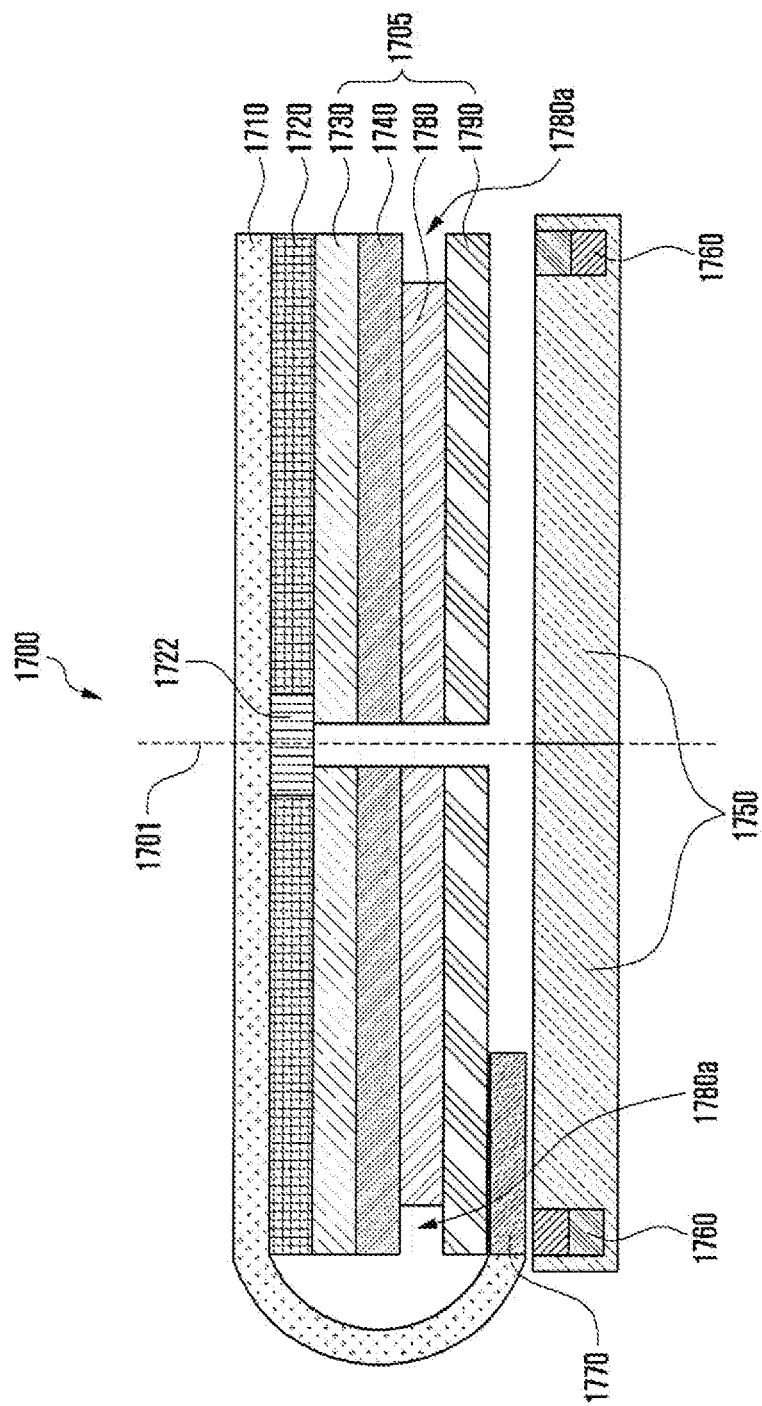
FIG. 17 is a view illustrating an electronic device according to certain embodiments of the disclosure.

FIG. 17 is a view illustrating an electronic device 1700 according to certain embodiments of the disclosure.

Referring to FIG. 17, the electronic device 1700 (e.g., the electronic device 101 in FIGS. 2 and 3) according to certain embodiments of the disclosure may include an electronic pen (e.g., the electronic pen 360 in FIGS. 6 and 8) (e.g., a stylus pen), a display 1710 (e.g., the display 200 in FIGS. 2 and 3), a flexible plate 1720, a digitizer 1705, a bracket 1750, a magnetic component 1760, a printed circuit board 1770, a plate 1780, and a magnetic shield part 1790.

In order to fix the electronic device 1700 in a folded state, magnetic components 1760 may be disposed on opposite sides of the bracket 1750. A groove or hole may be formed in at least a portion of each of the opposite sides of the bracket 1750, and the magnetic components 1760 may be disposed in the grooves or holes formed on the opposite sides of the bracket 1750.

As an embodiment, a flexible plate 1720 may be disposed under the display 1710 to support the display 1710. The flexible plate 1720 may include the lattice portion 1722 so that when the electronic device 1700 is folded, the display 1710 can be smoothly supported, folded, and unfolded in the folding area 1701. When the electronic device 1700 is folded by the lattice portion 1722 of the flexible plate 1720, operations according to folding and unfolding may be stably provided.

As an embodiment, the digitizer 1705 may be disposed under the flexible plate 1720. The digitizer 1705 may include a coil array layer 1730, a magnetic plate 1740 (e.g., magnetic metal powder (MMP)), and a plate 1780. The magnetic plate 1740 may be disposed under the coil array layer 1730. The plate 1780 may be disposed under the magnetic plate 1740. The magnetic shield part 1790 may be disposed under the plate 1780. As an example, the digitizer 1705 may be configured to include the magnetic shield part 1790.

As an embodiment, the display 1710 and the digitizer 1705 may be electrically connected to the printed circuit board 1770. The printed circuit board 1770 may include a processor (e.g., the processor 120 in FIG. 1), a memory (e.g., the memory 130 in FIG. 1), a digitizer controller that drives the digitizer 1705, and a display driver IC that drives the display 1710.

As an embodiment, the plate 1780 may include an opening 1780a in which at least a portion of the plate is cut. The opening 1780a of the plate 1780 may overlap the magnetic component 1760.

As an embodiment, the magnetic shield part 1790 may be disposed between the plate 1780 and the magnetic component 1760.

As an embodiment, when the electronic pen (e.g., the electronic pen 360 in FIGS. 6 and 8) (e.g., a stylus pen) approaches the electromagnetic field of the digitizer 1705, an electromagnetic induction phenomenon may occur, and the magnetic field of the electronic pen 360 (e.g., a stylus pen) may be induced into the digitizer 1705. By disposing the magnetic shield part 1790 on the entire bottom surface of the digitizer 1705 and forming an opening 1780a of the plate 1780 in a portion overlapping the magnetic component 1760, the influence of the magnetic field of the magnetic component 1760 on the digitizer 1705 can be reduced. By reducing an eddy current formed in the digitizer 1705 due to a magnetic field generated by the electronic pen 360 (e.g., a stylus pen), saturation of the magnetic plate 1740 (e.g., magnetic metal powder (MMP)) can be prevented or reduced. Through this, distortion of coordinates due to a nonuniform pen pressure of the electronic pen 360 (e.g., a stylus pen) or signal distortion can be prevented or reduced.

Figure 18:
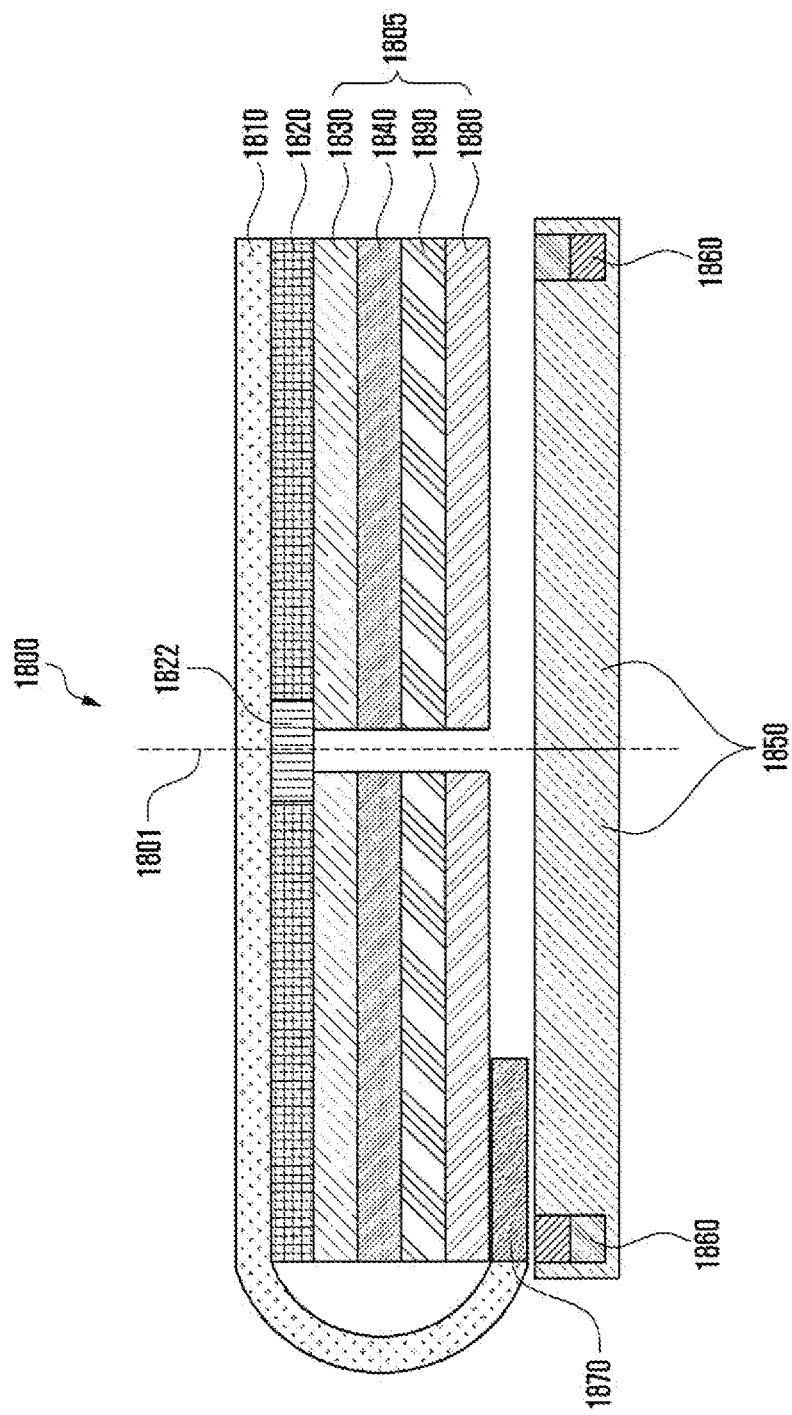
FIG. 18 is a view illustrating an electronic device according to certain embodiments of the disclosure.

FIG. 18 is a view illustrating an electronic device 1800 according to certain embodiments of the disclosure.

Referring to FIG. 18, the electronic device 1800 (e.g., the electronic device 101 in FIGS. 2 and 3) according to certain embodiments of the disclosure may include an electronic pen (e.g., the electronic pen 360 in FIGS. 6 and 8) (e.g., a stylus pen), a display 1810 (e.g., the display 200 in FIGS. 2 and 3), a flexible plate 1820, a digitizer 1805, a bracket 1850, a magnetic component 1860, and a printed circuit board 1870. The digitizer 1805 may include a coil array layer 1830, a magnetic plate 1840 (e.g., magnetic metal powder (MMP)), a plate 1880 (e.g., a conductive plate), and a magnetic shield part 1890.

In order to fix the electronic device 1800 in a folded state, magnetic components 1860 may be disposed on opposite sides of the bracket 1850. A groove or hole may be formed in at least a portion of each of the opposite sides of the bracket 1850, and the magnetic components 1860 may be disposed in the grooves or holes formed on the opposite sides of the bracket 1850.

As an embodiment, a flexible plate 1820 may be disposed under the display 1810 to support the display 1810. The flexible plate 1820 may include the lattice portion 1822 so that when the electronic device 1800 is folded, the display 1810 can be smoothly supported, folded, and unfolded in the folding area 1801. When the electronic device 1800 is folded by the lattice portion 1822 of the flexible plate 1820, operations according to folding and unfolding may be stably provided.

As an embodiment, the digitizer 1805 may be disposed under the flexible plate 1820. The magnetic plate 1840 may be disposed under the digitizer 1805. The magnetic shield part 1890 may be disposed under the magnetic plate 1840. The plate 1880 may be disposed under the magnetic shield part 1890.

As an embodiment, the display 1810 and the digitizer 1805 may be electrically connected to the printed circuit board 1870. The printed circuit board 1870 may include a processor (e.g., the processor 120 in FIG. 1), a memory (e.g., the memory 130 in FIG. 1), a digitizer controller that drives the digitizer 1805, and a display driver IC that drives the display 1810.

As an embodiment, the magnetic shield part 1890 may be disposed between the magnetic plate 1840 and the plate 1780. The magnetic shield part 1890 may overlap the digitizer 1805 and the plate 1880. The plate 1880 may be disposed between the magnetic shield part 1890 and the bracket 1850. The plate 1880 may overlap the magnetic shield part 1890 and the magnetic component 1860.

As an embodiment, when the electronic pen (e.g., the electronic pen 360 in FIGS. 6 and 8) (e.g., a stylus pen) approaches the electromagnetic field of the digitizer 1805, an electromagnetic induction phenomenon may occur, and the magnetic field of the electronic pen 360 (e.g., a stylus pen) may be induced into the digitizer 1805. By disposing the magnetic shield part 1890 on the entire bottom surface of the digitizer 1805 and disposing the plate 1880 on the entire bottom surface of the magnetic shield part 1890, the influence of the magnetic field of the magnetic component 1860 on the digitizer 1805 can be reduced. By reducing an eddy current formed in the digitizer 1805 due to a magnetic field generated by the electronic pen 360 (e.g., a stylus pen), saturation of the magnetic plate 1840 (e.g., magnetic metal powder (MMP)) can be prevented or reduced. Through this, distortion of coordinates due to a nonuniform pen pressure of the electronic pen 360 (e.g., a stylus pen) or signal distortion can be prevented or reduced.

Figure 19:
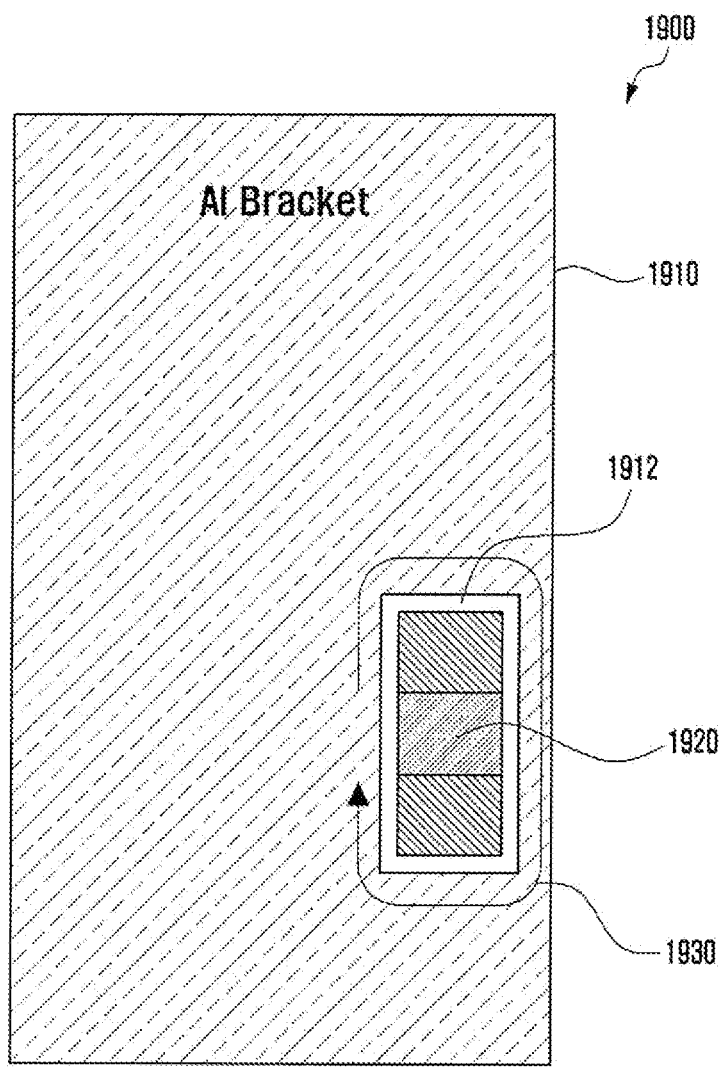
FIG. 19 is a view illustrating a bracket (e.g., an aluminum bracket) disposed to surround a magnetic component.

FIG. 19 is a view illustrating a bracket (e.g., an aluminum bracket) disposed to surround a magnetic component.

Referring to FIG. 19, a bracket 1910 of an electronic device 1900 may be formed of a metal material such as aluminum, and a display module (e.g., the display module 160 in FIG. 1) may be attached to the bracket 1910. A groove or hole 1912 may be formed in a portion of the bracket 1910, and a magnetic component 1920 may be disposed in the groove or hole 1912 of the bracket 1910. At this time, when the bracket 1910 is formed in a closed loop, an eddy current 1930 may be generated.

Figure 20:
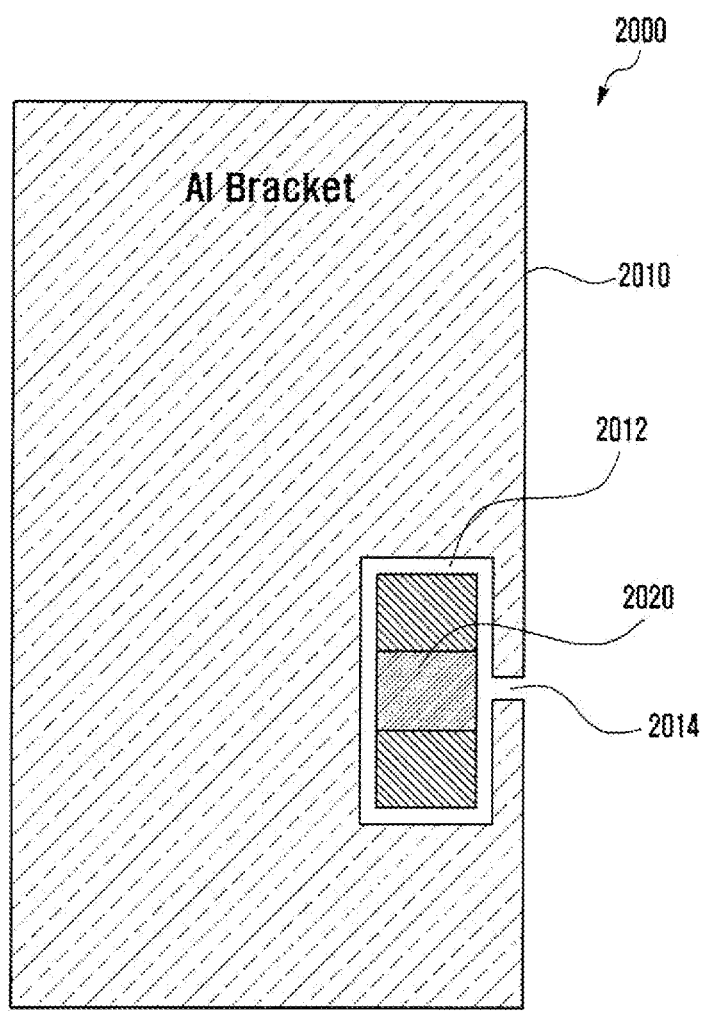
FIG. 20 is a view illustrating a bracket (e.g., an aluminum bracket) disposed to surround a magnetic component according to certain embodiments of the disclosure.

FIG. 20 is a view illustrating a bracket (e.g., an aluminum bracket) disposed to surround a magnetic component according to certain embodiments of the disclosure. The bracket 2010 includes a slit 2014 to reduce eddy currents.

Referring to FIG. 20, a groove or hole 2012 may be formed in the bracket 2010 of the electronic device 2000, and a magnetic component 2020 may be disposed in the groove or hole 2012 of the bracket 2010. At this time, in order to reduce the magnitude of an eddy current, a slit 2014 may be formed in at least a portion of the bracket 2010 so that a closed loop is not formed in the bracket 2010.

As an example, the slit 2014 may be formed in a portion adjacent to the magnetic component 2020 in the entire area of the bracket 2010. The slit 2014 may be formed in a portion adjacent to one side surface of the magnetic component 2020. The disclosure is not limited thereto, and a plurality of slits may be formed in portions adjacent to a plurality of side surfaces of the magnetic component 2020. In this way, by forming the slits 2014 in the bracket 2010, the magnitude of the eddy current can be reduced, and the influence of the eddy current on the digitizer can be reduced. Through this, distortion of coordinates due to a nonuniform pen pressure of the electronic pen 360 (e.g., a stylus pen) or signal distortion can be prevented or reduced.

An electronic device (e.g., the electronic device 101 in FIGS. 2 and 3, the electronic device 1000 in FIG. 10, the electronic device 1100 in FIG. 11, the electronic device 1200 in FIG. 12, the electronic device 1300 in FIG. 13, the electronic device 1400 in FIG. 14, the electronic device 1500 in FIG. 15, the electronic device 1600 in FIG. 16, the electronic device 1700 in FIG. 17, the electronic device 1800 in FIG. 18, the electronic device 1900 in FIG. 19, or the electronic device 2000 of FIG. 20) according to certain embodiments of the disclosure may include a display (e.g., the display 200 in FIGS. 2 and 3, the display 1010 in FIG. 10, the display 1110 in FIG. 11, the display 1210 in FIG. 12, the display 1310 in FIG. 13, the display 1410 in FIG. 14, the display 1510 in FIG. 15, the display 1610 in FIG. 16, the display 1710 in FIG. 17, or the display 1810 in FIG. 18, a coil array layer (e.g., the coil array layer 410 in FIG. 4, the coil array 610 in FIG. 6, the coil array layer 810 in FIG. 8, the coil array layer 1032 in FIG. 10, the coil array layer 1132 in FIG. 11, the coil array layer 1232 in FIG. 12, the coil array 1332 in FIG. 13, the coil array layer 1432 in FIG. 14, the coil array layer 1532 in FIG. 15, the coil array layer 1632 in FIG. 16, the coil array layer 1730 in FIG. 17, or the coil array 1830 in FIG. 18) disposed under the display, a magnetic layer (e.g., the magnetic layer 420 in FIG. 4, the magnetic layer 620 in FIG. 6, the magnetic layer 820 in FIG. 8, the magnetic layer 1034 in FIG. 10, the magnetic layer 1134 in FIG. 11, the magnetic layer 1234 in FIG. 12, the magnetic layer 1334 in FIG. 13, the magnetic layer 1434 in FIG. 14, the magnetic layer 1534 in FIG. 15, or the magnetic layer 1634 in FIG. 16) disposed below the coil array layer 410, 610, 810, 1032, 1132, 1232, 1332, 1432, 1532, 1632, 1730, or 1830, and a conductive layer (e.g., the conductive layer 430 in FIG. 4, the conductive layer 630 in FIG. 6, the conductive layer 830 in FIG. 8, and the conductive layer 1036 in FIG. 10, the conductive layer 1136 in FIG. 11, the conductive layer 1236 in FIG. 12, the conductive layer 1336 in FIG. 13, the conductive layer 1436 in FIG. 14, conductive layer 1536 in FIG. 15, or the conductive layer 1636 in FIG. 16) disposed under the magnetic layer 420, 620, 820, 1034, 1134, 1234, 1334, 1434, 1534, or 1634*a* conductive plate (e.g., the plate 640 in FIG. 6, the plate 840 in FIG. 8, the plate 1040 in FIG. 10, the plate 1140 in FIG. 11, the plate 1240 in FIG. 12, the plate 1340 in FIG. 13, the plate 1780 in FIG. 17, or the plate 1880 in FIG. 18) disposed under the conductive layer, a bracket (e.g., the bracket 1050 in FIG. 10, the bracket 1150 in FIG. 11, the bracket 1250 in FIG. 12, the bracket 1350 in FIG. 13, the bracket 1450 in FIG. 14, the bracket 1550 in FIG. 15, the bracket 1650 in FIG. 16, the bracket 1750 of FIG. 17, the bracket 1850 in FIG. 18, the bracket 1910 in FIG. 19, or the bracket 2010 of FIG. 20), and a magnetic component (e.g., the magnetic component 440 in FIG. 4, the magnetic component 650 in FIG. 6, the magnetic component 850 in FIG. 8, the magnetic component 1060 in FIG. 10, the magnetic component 1160 in FIG. 11, the magnetic component 1260 in FIG. 12, the magnetic component 1360 in FIG. 13, the magnetic component 1460 in FIG. 14, the magnetic component 1560 in FIG. 15, the magnetic component 1660 in FIG. 16, the magnetic component 1760 in FIG. 17, the magnetic component 1860 in FIG. 18, the magnetic component 1920 in FIG. 19, or the magnetic component 2020 in FIG. 20) disposed on the bracket. The conductive plate 640, 840, 1040, 1140, 1240, 1340, 1780, or 1880 may be disposed under the digitizer 400, 600, 800, 1030, 1130, 1230, 1330, 1430, 1530, 1630, 1705, or 1805. The bracket 1050, 1150, 1250, 1350, 1450, 1550, 1650, 1750, 1850, 1910, or 2010 may be disposed under the conductive plate 640, 840, 1040, 1140, 1240, 1340, 1780, or 1880. The magnetic component 440, 650, 850, 1060, 1160, 1260, 1360, 1460, 1560, 1660, 1760, 1860, 1920, or 2020 may be disposed under the bracket 1050, 1150, 1250, 1350, 1450, 1550, 1650, 1750, 1850, 1910, or 2010. The digitizer 400, 600, 800, 1030, 1130, 1230, 1330, 1430, 1530, 1630, 1705, or 1805 may include wherein the conductive layer 430, 630, 830, 1036, 1136, 1236, 1336, 1436, 1536, or 1636 has a first opening, and the first opening and the magnetic component 440, 650, 850, 1060, 1160, 1260, 1360, 1460, 1560, 1660, 1760, 1860, 1920, or 2020 may at least partially overlap each other.

According to an embodiment, at least a portion of the conductive plates 640, 840, 1040, 1140, 1240, 1340, 1780, or 1880 may have a second opening. The second opening and the magnetic components 440, 650, 850, 1060, 1160, 1260, 1360, 1460, 1560, 1660, 1760, 1860, 1920, or 2020 at least partially overlap each other.

According to an embodiment, the first opening may have a first width. The second opening may have a second width wider than the first width.

According to an embodiment, the electronic device 101, 1000, 1100, 1200, 1300, 1400, 1500, 1600, 1700, 1800, 1900, or 2000 according to certain embodiments of the disclosure may further include a magnetic shield layer disposed in the first opening.

According to an embodiment, the magnetic shield layer may include amorphous silicon, steel plate cold commercial (SPCC), or permalloy.

According to an embodiment, the magnetic shield layer may overlap the entire top surface of the magnetic component 440, 650, 850, 1060, 1160, 1260, 1360, 1460, 1560, 1660, 1760, 1860, 1920, or 2020.

According to an embodiment, the magnetic shield layer may be spaced apart from an end of the magnetic layer 420, 620, 820, 1034, 1134, 1234, 1334, 1434, 1534, or 1634 by a predetermined distance, and may overlap a portion of the top surface of the magnetic component 440, 650, 850, 1060, 1160, 1260, 1360, 1460, 1560, 1660, 1760, 1860, 1920, or 2020.

According to an embodiment, the magnetic component 440, 650, 850, 1060, 1160, 1260, 1360, 1460, 1560, 1660, 1760, 1860, 1920, or 2020 may be disposed in a groove or hole formed in the bracket 1050, 1150, 1250, 1350, 1450, 1550, 1650, 1750, 1850, 1910, or 2010). A slit may be formed in at least a portion of the bracket 1050, 1150, 1250, 1350, 1450, 1550, 1650, 1750, 1850, 1910, or 2010 located adjacent to the magnetic component 440, 650, 850, 1060, 1160, 1260, 1360, 1460, 1560, 1660, 1760, 1860, 1920, or 2020.

An electronic device (e.g., the electronic device 101 in FIGS. 2 and 3, the electronic device 1000 in FIG. 10, the electronic device 1100 in FIG. 11, the electronic device 1200 in FIG. 12, the electronic device 1300 in FIG. 13, the electronic device 1400 in FIG. 14, the electronic device 1500 in FIG. 15, the electronic device 1600 in FIG. 16, the electronic device 1700 in FIG. 17, the electronic device 1800 in FIG. 18, the electronic device 1900 in FIG. 19, or the electronic device 2000 of FIG. 20) according to certain embodiments of the disclosure may include a display (e.g., the display 200 in FIGS. 2 and 3, the display 1010 in FIG. 10, the display 1110 in FIG. 11, the display 1210 in FIG. 12, the display 1310 in FIG. 13, the display 1410 in FIG. 14, the display 1510 in FIG. 15, the display 1610 in FIG. 16, the display 1710 in FIG. 17, or the display 1810 in FIG. 18), a coil array layer (e.g., the coil array layer 410 in FIG. 4, the coil array 610 in FIG. 6, the coil array layer 810 in FIG. 8, the coil array layer 1032 in FIG. 10, the coil array layer 1132 in FIG. 11, the coil array layer 1232 in FIG. 12, the coil array 1332 in FIG. 13, the coil array layer 1432 in FIG. 14, the coil array layer 1532 in FIG. 15, the coil array layer 1632 in FIG. 16, the coil array layer 1730 in FIG. 17, or the coil array 1830 in FIG. 18), a magnetic layer (e.g., the magnetic layer 420 in FIG. 4, the magnetic layer 620 in FIG. 6, the magnetic layer 820 in FIG. 8, the magnetic layer 1034 in FIG. 10, the magnetic layer 1134 in FIG. 11, the magnetic layer 1234 in FIG. 12, the magnetic layer 1334 in FIG. 13, the magnetic layer 1434 in FIG. 14, the magnetic layer 1534 in FIG. 15, or the magnetic layer 1634 in FIG. 16) disposed below the coil array layer 410, 610, 810, 1032, 1132, 1232, 1332, 1432, 1532, 1632, 1730, or 1830, and a conductive layer (e.g., the conductive layer 430 in FIG. 4, the conductive layer 630 in FIG. 6, the conductive layer 830 in FIG. 8, and the conductive layer 1036 in FIG. 10, the conductive layer 1136 in FIG. 11, the conductive layer 1236 in FIG. 12, the conductive layer 1336 in FIG. 13, the conductive layer 1436 in FIG. 14, conductive layer 1536 in FIG. 15, or the conductive layer 1636 in FIG. 16) disposed under the magnetic layer 420, 620, 820, 1034, 1134, 1234, 1334, 1434, 1534, or 1634, a conductive plate (e.g., the plate 640 in FIG. 6, the plate 840 in FIG. 8, the plate 1040 in FIG. 10, the plate 1140 in FIG. 11, the plate 1240 in FIG. 12, the plate 1340 in FIG. 13, the plate 1780 in FIG. 17, or the plate 1880 in FIG. 18), a bracket (e.g., the bracket 1050 in FIG. 10, the bracket 1150 in FIG. 11, the bracket 1250 in FIG. 12, the bracket 1350 in FIG. 13, the bracket 1450 in FIG. 14, the bracket 1550 in FIG. 15, the bracket 1650 in FIG. 16, the bracket 1750 of FIG. 17, the bracket 1850 in FIG. 18, the bracket 1910 in FIG. 19, or the bracket 2010 of FIG. 20) under the conductive layer, a magnetic component (e.g., the magnetic component 440 in FIG. 4, the magnetic component 650 in FIG. 6, the magnetic component 850 in FIG. 8, the magnetic component 1060 in FIG. 10, the magnetic component 1160 in FIG. 11, the magnetic component 1260 in FIG. 12, the magnetic component 1360 in FIG. 13, the magnetic component 1460 in FIG. 14, the magnetic component 1560 in FIG. 15, the magnetic component 1660 in FIG. 16, the magnetic component 1760 in FIG. 17, the magnetic component 1860 in FIG. 18, the magnetic component 1920 in FIG. 19, or the magnetic component 2020 in FIG. 20), and a magnetic shield part (e.g., the magnetic shield part 1480 in FIG. 14, the magnetic shield part 1580 in FIG. 15, the magnetic shield part 1680 in FIG. 16, the magnetic shield part 1790 in FIG. 7, or the magnetic shield part 1890 in FIG. 18). The conductive plate 640, 840, 1040, 1140, 1240, 1340, 1780, or 1880 may be disposed under the conductive layer. The bracket 1050, 1150, 1250, 1350, 1450, 1550, 1650, 1750, 1850, 1910, or 2010 may be disposed under the conductive plate 640, 840, 1040, 1140, 1240, 1340, 1780, or 1880. The magnetic component 440, 650, 850, 1060, 1160, 1260, 1360, 1460, 1560, 1660, 1760, 1860, 1920, or 2020 may be disposed on/under the bracket 1050, 1150, 1250, 1350, 1450, 1550, 1650, 1750, 1850, 1910, or 2010 and under the conductive plate. The magnetic shield part may be disposed between the digitizer 400, 600, 800, 1030, 1130, 1230, 1330, 1430, 1530, 1630, 1705, or 1805 and the bracket 1050, 1150, 1250, 1350, 1450, 1550, 1650, 1750, 1850, 1910, or 2010), and may overlap at least a portion of the top surface of the magnetic component 440, 650, 850, 1060, 1160, 1260, 1360, 1460, 1560, 1660, 1760, 1860, 1920, or 2020. wherein the conductive layer 430, 630, 830, 1036, 1136, 1236, 1336, 1436, 1536, or 1636 has a first opening, and the first opening and the magnetic component 440, 650, 850, 1060, 1160, 1260, 1360, 1460, 1560, 1660, 1760, 1860, 1920, or 2020 may be disposed to at least partially overlap each other.

According to an embodiment, the electronic device 101, 1000, 1100, 1200, 1300, 1400, 1500, 1600, 1700, 1800, 1900, or 2000 according to certain embodiments of the disclosure the conductive layer 430, 630, 830, 1036, 1136, 1236, 1336, 1436, 1536, or 1636 may include a plurality of slits.

According to an embodiment, the plurality of slits, the magnetic shield part 1480, 1580, 1680, 1790, or 1890, and the magnetic component 440, 650, 850, 1060, 1160, 1260, 1360, 1460, 1560, 1660, 1760, 1860, 1920, or 2020 overlap each other.

According to an embodiment, the magnetic shield part 1480, 1580, 1680, 1790, or 1890 may include amorphous silicon, a steel plate cold commercial (SPCC), or permalloy.

According to an embodiment, the magnetic shield part 1480, 1580, 1680, 1790, or 1890 may overlap the entire top surface of the magnetic component 440, 650, 850, 1060, 1160, 1260, 1360, 1460, 1560, 1660, 1760, 1860, 1920, or 2020.

According to an embodiment, the magnetic shield part 1480, 1580, 1680, 1790, or 1890 may be spaced apart from an end of the magnetic layer 420, 620, 820, 1034, 1134, 1234, 1334, 1434, 1534, or 1634, and may overlap a portion of the top surface of the magnetic component 440, 650, 850, 1060, 1160, 1260, 1360, 1460, 1560, 1660, 1760, 1860, 1920, or 2020.

According to an embodiment, the magnetic component 440, 650, 850, 1060, 1160, 1260, 1360, 1460, 1560, 1660, 1760, 1860, 1920, or 2020 may be disposed in a groove or hole formed in the bracket 1050, 1150, 1250, 1350, 1450, 1550, 1650, 1750, 1850, 1910, or 2010). A slit may be formed in at least a portion of the bracket 1050, 1150, 1250, 1350, 1450, 1550, 1650, 1750, 1850, 1910, or 2010 located adjacent to the magnetic component 440, 650, 850, 1060, 1160, 1260, 1360, 1460, 1560, 1660, 1760, 1860, 1920, or 2020.

An electronic device (e.g., the electronic device 101 in FIGS. 2 and 3, the electronic device 1000 in FIG. 10, the electronic device 1100 in FIG. 11, the electronic device 1200 in FIG. 12, the electronic device 1300 in FIG. 13, the electronic device 1400 in FIG. 14, the electronic device 1500 in FIG. 15, the electronic device 1600 in FIG. 16, the electronic device 1700 in FIG. 17, the electronic device 1800 in FIG. 18, the electronic device 1900 in FIG. 19, or the electronic device 2000 of FIG. 20) according to certain embodiments of the disclosure may include a display (e.g., the display 200 in FIGS. 2 and 3, the display 1010 in FIG. 10, the display 1110 in FIG. 11, the display 1210 in FIG. 12, the display 1310 in FIG. 13, the display 1410 in FIG. 14, the display 1510 in FIG. 15, the display 1610 in FIG. 16, the display 1710 in FIG. 17, or the display 1810 in FIG. 18), a coil array layer (e.g., the coil array layer 410 in FIG. 4, the coil array 610 in FIG. 6, the coil array layer 810 in FIG. 8, the coil array layer 1032 in FIG. 10, the coil array layer 1132 in FIG. 11, the coil array layer 1232 in FIG. 12, the coil array 1332 in FIG. 13, the coil array layer 1432 in FIG. 14, the coil array layer 1532 in FIG. 15, the coil array layer 1632 in FIG. 16, the coil array layer 1730 in FIG. 17, or the coil array 1830 in FIG. 18), a magnetic layer (e.g., the magnetic layer 420 in FIG. 4, the magnetic layer 620 in FIG. 6, the magnetic layer 820 in FIG. 8, the magnetic layer 1034 in FIG. 10, the magnetic layer 1134 in FIG. 11, the magnetic layer 1234 in FIG. 12, the magnetic layer 1334 in FIG. 13, the magnetic layer 1434 in FIG. 14, the magnetic layer 1534 in FIG. 15, or the magnetic layer 1634 in FIG. 16) disposed below the coil array layer 410, 610, 810, 1032, 1132, 1232, 1332, 1432, 1532, 1632, 1730, or 1830, and a conductive layer (e.g., the conductive layer 430 in FIG. 4, the conductive layer 630 in FIG. 6, the conductive layer 830 in FIG. 8, and the conductive layer 1036 in FIG. 10, the conductive layer 1136 in FIG. 11, the conductive layer 1236 in FIG. 12, the conductive layer 1336 in FIG. 13, the conductive layer 1436 in FIG. 14, conductive layer 1536 in FIG. 15, or the conductive layer 1636 in FIG. 16) disposed under the magnetic layer 420, 620, 820, 1034, 1134, 1234, 1334, 1434, 1534, or 1634 a conductive plate (e.g., the plate 640 in FIG. 6, the plate 840 in FIG. 8, the plate 1040 in FIG. 10, the plate 1140 in FIG. 11, the plate 1240 in FIG. 12, the plate 1340 in FIG. 13, the plate 1780 in FIG. 17, or the plate 1880 in FIG. 18), a bracket (e.g., the bracket 1050 in FIG. 10, the bracket 1150 in FIG. 11, the bracket 1250 in FIG. 12, the bracket 1350 in FIG. 13, the bracket 1450 in FIG. 14, the bracket 1550 in FIG. 15, the bracket 1650 in FIG. 16, the bracket 1750 of FIG. 17, the bracket 1850 in FIG. 18, the bracket 1910 in FIG. 19, or the bracket 2010 of FIG. 20), a magnetic component (e.g., the magnetic component 440 in FIG. 4, the magnetic component 650 in FIG. 6, the magnetic component 850 in FIG. 8, the magnetic component 1060 in FIG. 10, the magnetic component 1160 in FIG. 11, the magnetic component 1260 in FIG. 12, the magnetic component 1360 in FIG. 13, the magnetic component 1460 in FIG. 14, the magnetic component 1560 in FIG. 15, the magnetic component 1660 in FIG. 16, the magnetic component 1760 in FIG. 17, the magnetic component 1860 in FIG. 18, the magnetic component 1920 in FIG. 19, or the magnetic component 2020 in FIG. 20), and a magnetic shield part (e.g., the magnetic shield part 1480 in FIG. 14, the magnetic shield part 1580 in FIG. 15, the magnetic shield part 1680 in FIG. 16, the magnetic shield part 1790 in FIG. 7, or the magnetic shield part 1890 in FIG. 18). The digitizer 400, 600, 800, 1030, 1130, 1230, 1330, 1430, 1530, 1630, 1705, or 1805 may be disposed under the display 200, 1010, 1110,1210, 1310, 1410, 1510,1610, 1710, or 1810. The conductive plate 640, 840, 1040, 1140, 1240, 1340, 1780, or 1880 may be disposed under the digitizer 400, 600, 800, 1030, 1130, 1230, 1330, 1430, 1530, 1630, 1705, or 1805. The bracket 1050, 1150, 1250, 1350, 1450, 1550, 1650, 1750, 1850, 1910, or 2010 may be disposed under the conductive plate 640, 840, 1040, 1140, 1240, 1340, 1780, or 1880. The magnetic component 440, 650, 850, 1060, 1160, 1260, 1360, 1460, 1560, 1660, 1760, 1860, 1920, or 2020 may be disposed under the bracket 1050, 1150, 1250, 1350, 1450, 1550, 1650, 1750, 1850, 1910, or 2010. The magnetic shield part 1480, 1580, 1680, 1790, or 1890 may be disposed to cover at least one surface of the magnetic component 440, 650, 850, 1060, 1160, 1260, 1360, 1460, 1560, 1660, 1760, 1860, 1920, or 2020. wherein the conductive layer 430, 630, 830, 1036, 1136, 1236, 1336, 1436, 1536, or 1636 has a first opening. The first opening and the magnetic components 440, 650, 850, 1060, 1160, 1260, 1360, 1460, 1560, 1660, 1760, 1860, 1920, or 2020 may be disposed to at least partially overlap each other.

According to an embodiment, the magnetic shield part 1480, 1580, 1680, 1790, or 1890 may surround one side surface and the bottom surface of the magnetic component 440, 650, 850, 1060, 1160, 1260, 1360, 1460, 1560, 1660, 1760, 1860, 1920, or 2020.

According to an embodiment, the magnetic shield part 1480, 1580, 1680, 1790, or 1890 may cover the top surface of the bracket 1050, 1150, 1250, 1350, 1450, 1550, 1650, 1750, 1850, 1910, or 2010.

According to an embodiment, the conductive plates 640, 840, 1040, 1140, 1240, 1340, 1780, or 1880 may have a second opening. The second opening and the magnetic components 440, 650, 850, 1060, 1160, 1260, 1360, 1460, 1560, 1660, 1760, 1860, 1920, or 2020 may be disposed to at least partially overlap each other. The first opening may have a first width. The second opening may have a second width wider than the first width.

According to an embodiment, the magnetic shield part 1480, 1580, 1680, 1790, or 1890 may include amorphous silicon, a steel plate cold commercial (SPCC), or permalloy.

An electronic device according to certain embodiments of the disclosure is capable of reducing the influence of a magnetic field of a magnetic component and the generation of an eddy current, thereby preventing or reducing distortion of coordinates due to a nonuniform pen pressure of an electronic pen (e.g., a stylus pen) or nonuniform.

Although certain embodiments have been described, it shall be understood that this disclosure is not limited to the foregoing embodiments. Moreover, although a certain degree of particularity has been used to describe embodiments herein, it shall be understood that the embodiments may be modified, and certain features may be omitted or modified without depart from the scope of this document.

The invention claimed is:

1. An electronic device comprising:
a display;
a coil array layer disposed under the display;
a magnetic layer disposed under the coil array layer;
a conductive layer disposed under the magnetic layer;
a bracket disposed under the conductive layer; and
a magnetic component disposed on the bracket and under the conductive layer,
wherein the conductive layer comprises a first opening and a slit extending from the first opening to an edge of the conductive layer, and
the first opening and the magnetic component at least partially overlap each other when the electronic device is in an unfolded state.

2. The electronic device of claim 1, further comprising:
a conductive plate disposed under the conductive layer;
wherein the conductive plate has a second opening, and
the second opening and the magnetic component at least partially overlap each other when the electronic device is in an unfolded state,
wherein the edge of the conductive layer is substantially along an edge of the coil array layer and an edge of the magnetic layer.

3. The electronic device of claim 2, wherein the first opening has a first width, and
the second opening has a second width wider than the first width.

4. The electronic device of claim 1, further comprising:
a magnetic shield layer disposed in the first opening.

5. The electronic device of claim 4, wherein the magnetic shield layer includes amorphous silicon, steel plate cold commercial (SPCC), or permalloy.

6. The electronic device of claim 4, wherein the magnetic shield layer overlaps an entire top surface of the magnetic component.

7. The electronic device of claim 4, wherein the magnetic shield layer is spaced apart from an end of the magnetic layer, and overlaps a portion of a top surface of the magnetic component.

8. The electronic device of claim 1, wherein the slit is formed in at least a portion of the conductive layer to prevent a closed loop from being formed in the conductive layer.

9. An electronic device comprising:
a display;
a coil array layer disposed under the display;
a magnetic layer disposed under the coil array layer;
a conductive layer disposed under the magnetic layer;
a bracket disposed under the conductive layer;
a magnetic component disposed on the bracket and under the conductive layer; and
a magnetic shield part disposed between the conductive layer and the bracket and overlapping at least a portion of a top surface of the magnetic component,
wherein the conductive layer comprises a first opening and a first slit extending from the first opening to an edge of the conductive layer, and
the first opening and the magnetic component are disposed to at least partially overlap each other when the electronic device is in an unfolded state.

10. The electronic device of claim 9, wherein the conductive layer comprises a plurality of second slits,
wherein the edge of the conductive layer is substantially along an edge of the coil array layer and an edge of the magnetic layer.

11. The electronic device of claim 10, wherein the plurality of second slits, the magnetic shield part, and the magnetic component overlap each other.

12. The electronic device of claim 9, wherein the magnetic shield part includes amorphous silicon, steel plate cold commercial (SPCC), or permalloy.

13. The electronic device of claim 9, wherein the magnetic shield part overlaps an entire top surface of the magnetic component.

14. The electronic device of claim 9, wherein the magnetic shield part is spaced apart from an end of the magnetic layer, and overlaps a portion of the top surface of the magnetic component.

15. The electronic device of claim 9, wherein the first slit is formed in the at least the portion of the conductive layer to prevent a closed loop from being formed in the conductive layer.

16. An electronic device comprising:
a display;
a coil array layer under the display;
a magnetic layer disposed under the coil array layer;
a conductive layer disposed under the magnetic layer;
a bracket disposed under the conductive layer;
a magnetic component disposed on the bracket; and
a magnetic shield part disposed to cover at least one surface of the magnetic component,
wherein the conductive layer comprises a first opening and a slit extending from the first opening to an edge of the conductive layer, and
the first opening and the magnetic component are disposed to at least partially overlap each other when the electronic device is in an unfolded state.

17. The electronic device of claim 16, wherein the magnetic shield part surrounds one side surface and a bottom surface of the magnetic component.

18. The electronic device of claim 16, wherein the magnetic shield part covers a top surface of the bracket.

19. The electronic device of claim 16, further comprising:
a conductive plate disposed under the conductive layer;
wherein the conductive plate has a second opening,
wherein the second opening and the magnetic component are disposed to at least partially overlap each other,
the first opening has a first width, and
the second opening has a second width wider than the first width, wherein the edge of the conductive layer is substantially along an edge of the coil array layer and an edge of the magnetic layer.

20. The electronic device of claim 16, wherein the magnetic shield part includes amorphous silicon, steel plate cold commercial (SPCC), or permalloy.

21. The electronic device of claim 1, wherein the slit is formed in at least a portion of the conductive layer to prevent a closed loop from being formed in the conductive layer.

* * * * *